United States Patent
Schultz et al.

(10) Patent No.: US 10,724,171 B2
(45) Date of Patent: Jul. 28, 2020

(54) ELECTRET WEBS WITH CHARGE-ENHANCING ADDITIVES

(71) Applicant: 3M INNOVATIVE PROPERTIES COMPANY, St. Paul, MN (US)

(72) Inventors: Nathan E. Schultz, Woodbury, MN (US); Fuming B. Li, Woodbury, MN (US); Kelly A. Volp, Minneapolis, MN (US); John M. Sebastian, Oakdale, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 83 days.

(21) Appl. No.: 15/741,370

(22) PCT Filed: Jun. 30, 2016

(86) PCT No.: PCT/US2016/040358
§ 371 (c)(1),
(2) Date: Jan. 2, 2018

(87) PCT Pub. No.: WO2017/007675
PCT Pub. Date: Jan. 12, 2017

(65) Prior Publication Data
US 2019/0003112 A1    Jan. 3, 2019

Related U.S. Application Data

(60) Provisional application No. 62/189,515, filed on Jul. 7, 2015.

(51) Int. Cl.
| | | |
|---|---|---|
| *B01D 39/16* | (2006.01) |
| *D06M 10/02* | (2006.01) |
| *D04H 13/00* | (2006.01) |
| *D04H 3/16* | (2006.01) |
| *D04H 1/42* | (2012.01) |
| *D06M 10/08* | (2006.01) |
| *D06M 13/352* | (2006.01) |
| *D06M 101/20* | (2006.01) |
| *D06M 101/22* | (2006.01) |
| *D06M 101/32* | (2006.01) |

(52) U.S. Cl.
CPC ....... *D06M 10/025* (2013.01); *B01D 39/1623* (2013.01); *D04H 1/42* (2013.01); *D04H 3/16* (2013.01); *D04H 13/00* (2013.01); *D06M 10/08* (2013.01); *D06M 13/352* (2013.01); *B01D 2239/0435* (2013.01); *D06M 2101/20* (2013.01); *D06M 2101/22* (2013.01); *D06M 2101/32* (2013.01)

(58) Field of Classification Search
CPC ................................................. B01D 39/1623
See application file for complete search history.

(56) References Cited

U.S. PATENT DOCUMENTS

| | | |
|---|---|---|
| 30,782 A | 11/1860 | Wright |
| 31,285 A | 1/1861 | Miller |
| 32,171 A | 4/1861 | Alexander |
| 3,971,373 A | 7/1976 | Braun |
| 4,100,324 A | 7/1978 | Anderson |
| 4,118,531 A | 10/1978 | Hauser |
| 4,215,682 A | 8/1980 | Kubik |
| 4,251,435 A | 2/1981 | Son |
| 4,264,750 A | 4/1981 | Anand |
| 4,340,563 A | 7/1982 | Appel |
| 4,375,718 A | 3/1983 | Wadsworth |
| 4,429,001 A | 1/1984 | Kolpin |
| 4,508,781 A | 4/1985 | Yagi |
| 4,557,945 A | 12/1985 | Yagi |
| 4,588,537 A | 5/1986 | Klaase |
| 4,592,815 A | 6/1986 | Nakao |
| 4,652,282 A | 3/1987 | Ohmori |
| 4,789,504 A | 12/1988 | Ohmori |
| 4,874,659 A | 10/1989 | Ando |
| 5,057,710 A | 10/1991 | Nishiura |
| 5,096,977 A | 3/1992 | MacLeay |
| 5,110,849 A * | 5/1992 | Karasawa ............ C08K 5/0008 524/111 |
| 5,233,047 A | 8/1993 | MacLeay |
| 5,401,446 A | 3/1995 | Tsai |
| 5,496,507 A | 3/1996 | Angadjivand |
| 5,663,128 A | 9/1997 | Evans |
| 5,871,845 A | 2/1999 | Dahringer |
| 5,908,598 A | 6/1999 | Rousseau |
| 5,914,186 A | 6/1999 | Yau |

(Continued)

FOREIGN PATENT DOCUMENTS

| | | |
|---|---|---|
| EP | 0351732 | 1/1990 |
| JP | 02292357 A * | 12/1990 |
| JP | 2011-006810 | 1/2011 |

OTHER PUBLICATIONS

Matteucci, Mild and Highly Chemoselective Oxidation of Thioethers Mediated by Sc(OTf)$_3$, Organic Letters, 2003, vol. 5, No. 3, pp. 235-237.

Neufeld, "Accurate molecular weight determination of small molecules via DOSY-NMR by using external calibration curves with normalized diffusion coefficients", Chemical Science, 2015, vol. 6, pp. 3354-3364.

Nilsson, "The DOSY Toolbox: A new tool for processing PFG NMR diffusion data", Journal of Magnetic Resonance, 2009, vol. 200, No. 2, pp. 296-302.

(Continued)

Primary Examiner — Michael F Pepitone
(74) Attorney, Agent, or Firm — Jeffrey M. Olofson

(57) ABSTRACT

Electret webs include a thermoplastic resin and a charge-enhancing additive. The charge-enhancing additive is a substituted benzotriazole phenolate salt or a combination of substituted benzotriazole phenolate salts. The electret webs may be a non-woven fibrous web or a film. The electret webs are suitable for use as filter media.

23 Claims, No Drawings

(56) References Cited

U.S. PATENT DOCUMENTS

| | | |
|---|---|---|
| 5,919,847 A | 7/1999 | Rousseau |
| 5,922,882 A | 7/1999 | Mori |
| 5,968,635 A | 10/1999 | Rousseau |
| 5,976,208 A | 11/1999 | Rousseau |
| 6,213,122 B1 | 4/2001 | Rousseau |
| 6,214,094 B1 | 4/2001 | Rousseau |
| 6,238,466 B1 | 5/2001 | Rousseau |
| 6,268,495 B1 | 7/2001 | Rousseau |
| 6,365,088 B1 | 4/2002 | Knight |
| 6,375,886 B1 | 4/2002 | Angadjivand |
| 6,397,458 B1 | 6/2002 | Jones |
| 6,398,847 B1 | 6/2002 | Jones |
| 6,406,657 B1 | 6/2002 | Eitzman |
| 6,409,806 B1 | 6/2002 | Jones |
| 6,419,871 B1 | 7/2002 | Ogale |
| 6,432,175 B1 | 8/2002 | Jones |
| 6,451,887 B1 | 9/2002 | Wood |
| 6,454,986 B1 | 9/2002 | Eitzman |
| 6,524,488 B1 | 2/2003 | Insley |
| 6,562,112 B2 | 5/2003 | Jones |
| 6,607,624 B2 | 8/2003 | Berrigan |
| 6,660,210 B2 | 12/2003 | Jones |
| 6,743,464 B1 | 6/2004 | Insley |
| 6,789,241 B2 | 9/2004 | Anderson |
| 6,800,676 B2 | 10/2004 | Wood |
| 6,808,551 B2 | 10/2004 | Jones |
| 6,824,718 B2 | 11/2004 | Eitzman |
| 6,916,752 B2 | 7/2005 | Berrigan |
| 7,244,291 B2 | 7/2007 | Spartz |
| 7,244,292 B2 | 7/2007 | Kirk |
| 7,390,351 B2 | 6/2008 | Leir |
| 7,765,698 B2 | 8/2010 | Sebastian |
| 8,162,153 B2 | 4/2012 | Fox |
| 8,790,449 B2 | 7/2014 | Li |
| 2002/0174869 A1 | 11/2002 | Gahan |
| 2003/0004235 A1 | 1/2003 | Wood |
| 2003/0134515 A1 | 7/2003 | David |
| 2003/0192231 A1 | 10/2003 | Wood |
| 2003/0213164 A1 | 11/2003 | Pastor |
| 2004/0092634 A1 | 5/2004 | Arnoldi |
| 2008/0038976 A1 | 2/2008 | Berrigan |
| 2012/0302760 A1 | 11/2012 | Preschel |

OTHER PUBLICATIONS

Rosevear, "Preparation of some 2-(2' H-Benzotriazol-2'-yl)phenol ultraviolet absorbers: Application of the transalkylation reaction", Australian Journal of Chemistry, 1985, vol. 38, No. 08, pp. 1163-1176, XP055294724.

Seechurn, "Palladium-Catalyzed Cross-Coupling: A Historical Contextual Perspective to the 2010 Nobel Prize", Angewandte Chemie International Edition, May 2012, vol. 51, No. 21, pp. 5062-5085.

Valiev, "NWChem: a comprehensive and scalable open-source solution for large scale molecular simulations", Computer Physics Communications, 2010, vol. 181, No. 9, pp. 1477-1489.

Varma, "The Urea-Hydrogen Peroxide Complex: Solid-State Oxidativve Protocols for Hydroxylated Adehydes and Ketones (Dakin Reaction), Nitriles, Sulfides, and Nitrogen Heterocycles", Organic Letters,1991, vol. 1, No. 2, pp. 189-191.

Waker, "Application of Cavity Theory to the Discharge of Electrostatic Dust Filters by x-Rays", International Journal of Radiation Applications and Instrumentation. Part A. Applied Radiation and Isotopes, 1988, vol. 39, No. 7, pp. 677-684.

Wente, "Superfine Thermoplastic Fibers," Industrial and Engineering Chemistry, Aug. 1956, vol. 48, No. 8, pp. 1342-1346.

Wente, "Manufacture of Superfine Organic Fibers", Report No. 4364 of the Naval Research Laboratories, May 1954, pp. 1-20.

Wu, "A Single Phosphine Ligand Allows Palladium-Catalyzed Intermolecular CO Bond Formation with Secondary and Primary Alcohols", Angewandte Chemie International Edition, Sep. 2011, vol. 50, No. 42, pp. 9943-9947.

Xu, "Synthesis of diaryl-azo derivatives as potential antifungal agents", Bioorganic & Medicinal Chemistry Letter, Jul. 2010, vol. 20, No. 14, pp. 4193-4195.

International Search Report for PCT International Application No. PCT/US2016/040358, dated Sep. 29, 2016, 5 pages.

* cited by examiner

ELECTRET WEBS WITH CHARGE-ENHANCING ADDITIVES

FIELD OF THE DISCLOSURE

This disclosure relates to electret webs, including non-woven fibrous webs such as non-woven thermoplastic microfiber webs, containing charge-enhancing additives and uses thereof.

BACKGROUND

An electret is a dielectric material that exhibits a quasi-permanent electrical charge. Electrets are useful in a variety of devices including, e.g. cling films, air filters, filtering facepieces, and respirators, and as electrostatic elements in electro-acoustic devices such as microphones, headphones, and electrostatic recorders.

The performance of microfibrous webs used for aerosol filtration can be improved by imparting an electrical charge to the fibers, forming an electret material. In particular, electrets are effective in enhancing particle capture in aerosol filters. A number of methods are known for forming electret materials in microfibrous webs. Such methods include, for example, bombarding melt-blown fibers as they issue from the die orifices, as the fibers are formed, with electrically charged particles such as electrons or ions. Other methods include, for example, charging the fibers after the web is formed, by means of a corona discharge or imparting a charge to the fiber mat by means of carding and/or needle tacking (tribocharging). In addition, a method in which jets of water or a stream of water droplets impinge on a non-woven web at a pressure sufficient to provide filtration enhancing electret charge has also been described (hydrocharging).

A number of materials have been added to polymeric compositions to modify the properties of the polymeric composition. For example, in U.S. Pat. No. 5,914,186 (Yau et al.), heat-resistant anti-static pressure sensitive adhesive tapes are described that comprise a substrate having coated on it a microparticle adhesive having a diameter of at least 1 micrometer. The microparticles have a conductive coating formed from a polymer electrolyte base polymer, at least one ionic salt of an alkali or alkaline earth metal, and at least one thermal stabilizer selected from the group consisting of hindered amines, salts of substituted toluimidazoles, and mixtures thereof.

Examples of electrets that have additives added include electrets with antibacterial additives as described in Japanese Patent Publication JP 08284063 which describes N-n-butylcarbamic acid 3-9 iodo-2-propynyl ester containing either an amidine or guanidine group, and 2-(4-thiazolyl) benzimidazole, and PCT Publication WO 93/14510 which describes hindered amine compounds, nitrogenous hindered phenol compounds, metallic salt hindered phenol compounds, phenol compounds, sulfur compounds, and phosphorous compounds. Japanese Patent Publication JP 06254319 describes the use of metal salts of long chain organic acids in polyolefin electrets to lessen the attenuation of the electrification quantity. European Patent Publication No. EP 623,941 describes the use of Charge Control Agents from various chemical classes in polymer electrets. U.S. Pat. No. 5,871,845 (Dahringer et al.) describes electret fibers composed of a fiber-forming polymer or polycondensate and organic or organometallic charge control compounds as contained in toners for electrophotographic processes.

Also described are processes for producing high stability electrets, such as European Patent Publication No. EP 447,166 which describes a process for producing electrets comprising alternating at least two cycles of applying electric charge and subsequently heating, and also describes electrets containing polar high-molecular weight compounds, and U.S. Pat. No. 4,874,659 (Ando et al.) which describes a process comprising placing a fiber sheet between a non-contact voltage-applied electrode and an earth electrode and supplying electricity between the electrodes.

SUMMARY

Disclosed herein are electret webs containing charge-enhancing additives and uses thereof. The electric webs include a thermoplastic resin and a charge-enhancing additive comprising at least one substituted benzotriazole phenolate salt.

In some embodiments, the charge-enhancing additive comprises a substituted benzotriazole phenolate anion and a metal cation with the structure:

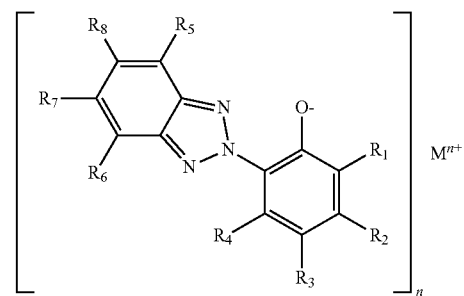

where $R^1$ and $R^3$ independently comprises a hydrogen atom or a substituent group such that at least one of $R^1$ and $R^3$ is a substituent group comprising a halogen atom, an alkyl or substituted alkyl group, an alkenyl group, or a group comprising an $—O—R^9$, a $—N—R^9R^{10}$, a $—B(OR^{18})(OR^{19})$, or a $—SiR^{20}_3$, where $R^9$ comprises a hydrogen atom, an alkyl group, an alkenyl group, an aryl group, or a heteroatom-containing group comprising one or more oxygen, nitrogen, sulfur, or phosphorous atoms, and $R^{10}$ comprises a hydrogen atom, an alkyl group, an alkenyl group, an aryl group, or a heteroatom-containing group comprising one or more oxygen, nitrogen, sulfur, or phosphorous atoms, or $R^9$ and $R^{10}$ together with the atoms connecting form a heterocyclic ring structure, each $R^{18}$ and $R^{19}$ is independently a hydrogen atom, an alkyl group, an aryl group, or $R^{18}$ and $R^{19}$ together with the atoms connecting form a heterocyclic ring structure, and each $R^{20}$ group is an alkyl group, each $R^2$, $R^4$, $R^5$, $R^6$, $R^7$, and $R^8$, independently comprises a hydrogen atom, an alkyl group, an alkenyl group, an aryl group, or a halogen atom; n is the valency of metal atom M and also is the stoichiometric number of for the anionic portion of the salt, and is an integer of 1-4; and M comprises a transition metal or main group metal atom with a valency of n.

In other embodiments, the charge-enhancing additive comprises a substituted benzotriazole phenolate anion and a metal cation with the structure:

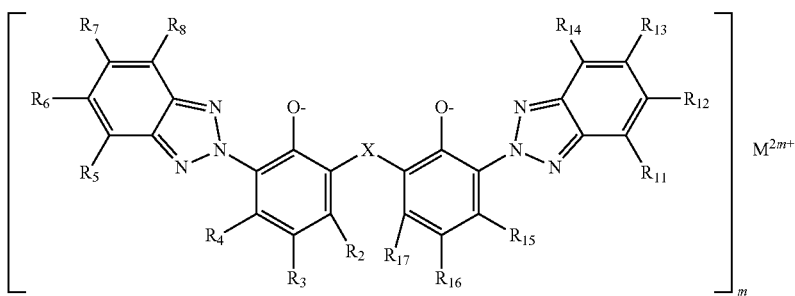

where X comprises a —CH$_2$—, —O—, —S—, —S(O)—, —S(O)$_2$—, or —NR$^{10}$— linking group where R$^1$ comprises a hydrogen atom, an alkyl group, or an aryl group, each R$^2$, R$^3$, R$^4$, R$^5$, R$^6$, R$^7$, R$^8$, R$^{11}$, R$^{12}$, R$^{13}$, R$^{14}$, R$^{15}$, R$^{16}$, and R$^{17}$, independently comprises a hydrogen atom, an alkyl group, an alkenyl group, an aryl group, or a halogen atom; m=0.5, 1, or 2; M is a metal ion with a valency of 2 m such that M is lithium sodium or potassium when m=0.5; M is calcium, magnesium, or cobalt, when m=1; and M is vanadium or titanium when m=2.

DETAILED DESCRIPTION

The need remains for electret webs with improved properties. Presented in this disclosure are electret webs containing charge-enhancing additives. These charge-enhancing additives provide electret webs that are easy to charge by a variety of different charging mechanisms such as tribocharging, corona discharge, hydrocharging or a combination thereof. Electret webs useful in the present disclosure include a blend of a thermoplastic resin and a charge-enhancing additive. Webs prepared from such blends can show enhanced properties over webs prepared with the thermoplastic resins alone. Useful charge-enhancing additives include substituted benzotriazole phenolate salts.

The electret webs may be in a variety of forms. For example the web may be a continuous or discontinuous film, or a fibrous web. Fibrous webs are particularly useful for the formation of filtration medium. In some embodiments the web is a non-woven microfibrous web. Typically microfibers are 1-100 micrometers, or more typically 2-30 micrometers in effective diameter (or average diameter if measured by a method such as scanning electron microscopy) and the microfibers need not have a circular cross-section.

The terms "a", "an", and "the" are used interchangeably with "at least one" to mean one or more of the elements being described.

The term "electret" refers to a material that exhibits a quasi-permanent electric charge. The electric charge may be characterized by a variety of techniques.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl (t-butyl), n-pentyl, n-hexyl, cyclohexyl, n-heptyl, n-octyl, and ethylhexyl.

The term "heteroalkyl" refers to an alkyl group which contains heteroatoms. These heteroatoms may be pendant atoms, for example, halogens such as fluorine, chlorine, bromine, or iodine or catenary atoms such as nitrogen, oxygen or sulfur. An example of a heteroalkyl group is a polyoxyalkyl group such as —CH$_2$CH$_2$(OCH$_2$CH$_2$)$_n$OCH$_2$CH$_3$.

The term "alkoxy" refers to a group with the general structure —O—R, where R is an alkyl group. The term "aryloxy" refers to a group with the general structure —O—R, where R is an aryl group. In some instances, the term alkoxy is used generically to describe both alkoxy and aryloxy groups.

The term "substituted alkyl" refers to an alkyl group which contains substituents along the hydrocarbon backbone. These substituents may be alkyl groups, heteroalkyl groups or aryl groups. An example of a substituted alkyl group is a benzyl group.

The term "alkenyl" refers to a monovalent group that is a radical of an alkene, which is a hydrocarbon with at least one carbon-carbon double bond. The alkenyl can be linear, branched, cyclic, or combinations thereof and typically contains 2 to 20 carbon atoms. In some embodiments, the alkenyl contains 2 to 18, 2 to 12, 2 to 10, 4 to 10, 4 to 8, 2 to 8, 2 to 6, or 2 to 4 carbon atoms. Exemplary alkenyl groups include ethenyl, n-propenyl, and n-butenyl.

The term "aryl" refers to an aromatic carbocyclic group that is a radical containing 1 to 5 rings which may be connected or fused. The aryl group may be substituted with alkyl or heteroalkyl groups. Examples of aryl groups include phenyl groups, naphthalene groups and anthracene groups. By "fused aromatic" ring it is meant a ring system comprising at least one aromatic ring joined by more than a single chemical bond to one or more other rings. In the present disclosure, the fused aromatic rings comprise at least one aromatic ring and one hetrocyclic ring.

The term "heterocyclic ring" refers to a carbocyclic ring which contains at least one heteroatom in or attached to the ring system.

The terms "polymer" and "polymeric material" refer to both materials prepared from one monomer such as a homopolymer or to materials prepared from two or more monomers such as a copolymer, terpolymer, or the like. Likewise, the term "polymerize" refers to the process of making a polymeric material that can be a homopolymer, copolymer, terpolymer, or the like. The terms "copolymer" and "copolymeric material" refer to a polymeric material prepared from at least two monomers.

The terms "room temperature" and "ambient temperature" are used interchangeably to mean temperatures in the range of 20° C. to 25° C.

The term "hot melt processable" as used herein, refers to a composition that can transform, for example, by heat and pressure from a solid to a viscous fluid. The composition should be capable of being hot melt processed without being substantially chemically transformed, degraded or rendered unusable for the intended application.

Unless otherwise indicated, all numbers expressing feature sizes, amounts, and physical properties used in the specification and claims are to be understood as being modified in all instances by the term "about." Accordingly, unless indicated to the contrary, the numbers set forth are approximations that can vary depending upon the desired properties using the teachings disclosed herein.

Thermoplastic resins useful in the present disclosure include any thermoplastic nonconductive polymer capable of retaining a high quantity of trapped electrostatic charge when formed into a web and charged. Typically, such resins have a DC (direct current) resistivity of greater than $10^{14}$ ohm-cm at the temperature of intended use. Polymers capable of acquiring a trapped charge include polyolefins such as polypropylene, polyethylene, and poly-4-methyl-1-pentene; polyvinyl chloride; polystyrene; polycarbonates; polyesters, including polylactides; and perfluorinated polymers and copolymers. Particularly useful materials include polypropylene, poly-4-methyl-1-pentene, blends thereof or copolymers formed from at least one of propylene and 4-methyl-1-pentene.

Examples of suitable thermoplastic resins include, for example, the polypropylene resins: ESCORENE PP 3746G commercially available from Exxon-Mobil Corporation, Irving, Tex.; TOTAL PP3960, TOTAL PP3860, and TOTAL PP3868 commercially available from Total Petrochemicals USA Inc., Houston, Tex.; and METOCENE MF 650 W commercially available from LyondellBasell Industries, Inc., Rotterdam, Netherlands; and the poly-4-methyl-1-pentene resin TPX-MX002 commercially available from Mitsui Chemicals, Inc., Tokyo, Japan.

Phenolate salts are used as charge enhancing agents for electret webs. Benzotriazole phenols are known and used as UV light absorbers, but benzotriazole salts are far less common and have been studied far less than the benzotriazole phenols from which they are made. In EP Patent Publication No. 351,732 a variety of benzotriazole phenolate salts are used as the essential ingredient to give high crystallization rates in polyester polymer compositions.

In this disclosure, a wide variety of substituted benzotriazole phenolate salts have been prepared and have been shown to be useful charge enhancing additives for electret webs. These phenolate salts are further described in copending application 62/189,473 Attorney Docket No. 76176US002 title "Substituted Benzotriazole Phenolate Salts" filed on the same day as the present disclosure. Some of these salts are new compositions of matter comprising salts of substituted benzotriazole phenolate anions and metal cations. Others are salts prepared from commercially available phenol materials.

Among the compositions disclosed herein are compositions of matter comprising salts that are a substituted benzotriazole phenolate anion and a metal cation with the structure of Formula I:

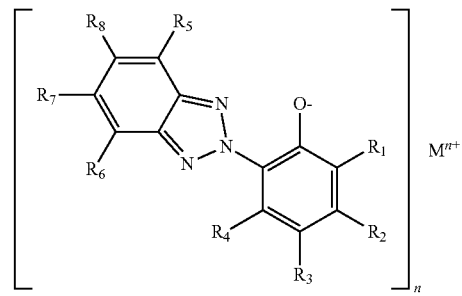

Formula I

In Formula I, at least one of $R^1$ and $R^3$ comprises a substituent group, that is to say a group other than a hydrogen atom. In many embodiments, both $R^1$ and $R^3$ comprise substituent groups. In some embodiments $R^1$ is not substituted i.e. $R^1$ comprises a hydrogen atom, in many other embodiments $R^1$ is a substituent group. In Formula 1, n is an integer of 1-4, and M comprises a transition metal or main group metal atom with a valency of n. In some embodiments, where n=1, M comprises lithium, sodium, or potassium. The value n also refers to the stoichiometry of the anionic portion of the salt. If the valency of M is greater than 1, the metal cation is complexed with n anionic portions.

In embodiments where $R^1$ is not substituted (i.e. is a hydrogen atom), $R^3$ comprises an alkyl, alkoxy or aryloxy group comprising 1-20 carbon atoms, and each $R^2$, $R^4$, $R^5$, $R^6$, $R^7$, and $R^8$, independently comprises a hydrogen atom, an alkyl group, an alkenyl group, an aryl group, or a halogen atom. In one embodiment, $R^1$ comprises a hydrogen atom, $R^3$ comprises an alkyl group with one carbon atom, and each $R^2$, $R^4$, $R^5$, $R^6$, $R^7$, and $R^8$, independently comprises a hydrogen atom. In another embodiment, $R^1$ comprises a hydrogen atom, $R^3$ comprises an alkoxy group with 4 carbon atoms, and each $R^2$, $R^4$, $R^5$, $R^6$, $R^7$, and $R^8$, independently comprises a hydrogen atom.

In a wide variety of embodiments $R^1$ comprises a substituent group or a linking group. The embodiments where $R^1$ comprises a linking group (of the general formula —X—Y where Y is a group that is comparable in size and/or steric size to the benzotriazole phenolate base molecule) will be discussed below in relation to Formula II. In the embodiments where $R^1$ comprises a substituent group, $R^1$ comprises a halogen atom, an alkyl or substituted alkyl group, an alkenyl group, or a group comprising an —O—$R^9$, a —N—$R^9R^{10}$, a —B(O$R^{18}$)(O$R^{19}$), or a —Si$R^{20}{}_3$. In these embodiments $R^9$ comprises a hydrogen atom, an alkyl group, an alkenyl group, an aryl group, or a heteroatom-containing group comprising one or more oxygen, nitrogen, sulfur, or phosphorous atoms, and $R^{10}$ comprises a hydrogen atom, an alkyl group, an alkenyl group, an aryl group, or a heteroatom-containing group comprising one or more oxygen, nitrogen, sulfur, or phosphorous atoms, or $R^9$ and $R^{10}$ together with the atoms connecting form a heterocyclic ring structure, each $R^{18}$ and $R^{19}$ is independently a hydrogen atom, an alkyl group, an aryl group, or $R^{18}$ and $R^{19}$ together with the atoms connecting form a heterocyclic ring structure, each $R^{20}$ group is an alkyl group, and each $R^2$, $R^3$, $R^4$, $R^5$, $R^6$, $R^7$, and $R^8$, independently comprises a hydrogen atom, an alkyl group, an alkenyl group, an aryl group, or a halogen atom. Each of these embodiments will be described in greater detail below.

In some embodiments, $R^1$ comprises a halogen atom. Suitable halogen atoms include fluorine, bromine, chlorine and iodine. Bromine (Br) and chlorine (Cl) are particularly suitable.

In some embodiments, $R^1$ comprises an alkyl group, an alkenyl group, or a substituted alkyl group. When $R^1$ comprises an alkyl group typically $R^1$ comprises an alkyl group with 1-6 carbon atoms, in one particular embodiment $R^1$ comprises an alkyl group with 4 carbon atoms, generally a tert-butyl group, and $R^3$ is an alkyl group with 4 carbon atoms, typically a tert-butyl group. When $R^1$ comprises an alkenyl group typically $R^1$ comprises an alkenyl group with 1-6 carbon atoms, in one particular embodiment $R^1$ comprises an alkenyl group with 3 carbon atoms, generally a propenyl group, and $R^3$ is an alkyl group with 1 carbon atom, typically a methyl group. When $R^1$ comprises a substituted alkyl group typically $R^1$ comprises an aryl substituted alkyl group with 1-12 carbon atoms, in one particular embodiment $R^1$ comprises an substituted alkyl group with 10 carbon atoms, a 2,2-dimethyl-3-phenyl group, and $R^3$ is an alkyl group with 8 carbon atoms, typically an iso-octyl group.

In some embodiments, where $R^1$ comprises an —O—$R^9$ group wherein $R^9$ comprises an alkyl group with 1-20 carbon atoms, or an aryl group. In many of these embodiments, $R^3$ is also a substituent group, typically $R^3$ is an alkyl group with 1-20 carbon atoms.

In some embodiments, $R^9$ comprises an alkyl group with 1-6 carbon atoms, in one particular embodiment $R^9$ comprises an alkyl group with 4 carbon atoms, and $R^3$ is an alkyl group with 8 carbon atoms, typically an iso-octyl group.

In other embodiments, $R^9$ comprises an aryl group comprising a substituted phenyl group. In some particular embodiments, $R^9$ comprises a 3-methyl phenyl group or a 4-methyl phenyl group, and $R^3$ is an alkyl group with 8 carbon atoms, typically an iso-octyl group.

In another group of embodiments, $R^1$ comprises an —N—$R^9R^{10}$ group. In some of these embodiments, $R^9$ comprises an alkyl group with 1-20 carbon atoms, or an aryl group. In these embodiments, $R^{10}$ independently comprises a hydrogen atom or alkyl group with 1-6 carbon atoms. In many of these embodiments, $R^3$ is also a substituent group, typically $R^3$ is an alkyl group with 1-20 carbon atoms.

In some embodiments, $R^9$ comprises an alkyl group with 1-6 carbon atoms, or an aryl group comprising a 4-alkyl substituted phenyl group, wherein the alkyl substituted group has 1-6 carbon atoms, and $R^{10}$ comprises a hydrogen atom.

In one particular embodiment, $R^9$ comprises an alkyl group with 1 carbon atom (a methyl group), $R^{10}$ comprises a hydrogen atom, and $R^3$ is an alkyl group with 8 carbon atoms, typically an iso-octyl group. In one particular embodiment, $R^9$ comprises an alkyl group with 6 carbon atoms, $R^{10}$ comprises a hydrogen atom, and $R^3$ is an alkyl group with 8 carbon atoms, typically an iso-octyl group. In yet another particular embodiment, $R^9$ comprises a 4-alkyl substituted phenyl group, wherein the alkyl substituted group has 6 carbon atoms (i.e. the group comprises a 4-hexyl phenyl group), $R^{10}$ comprises a hydrogen atom, and $R^3$ is an alkyl group with 8 carbon atoms, typically an iso-octyl group.

In another particular embodiment, $R^1$ comprises a —B(OH)$_2$ group, in other embodiments $R^1$ comprises —B(—O—C(Me)$_2$-C(Me)$_2$-O—), and $R^3$ is an alkyl group with 8 carbon atoms, typically an iso-octyl group.

In another particular embodiment, $R^1$ comprises a —SiR$^{20}$3 group where $R^{20}$ comprises an alkyl group with 1-6 carbon atoms, in some embodiments $R^{20}$ comprises 3 carbon atoms, typically $R^{20}$ comprises an isopropyl group.

As mentioned above, in other embodiments the $R^1$ group is a substituent group that is comparable in size and/or steric size to the benzotriazole phenolate base molecule, and is in fact another benzotriazole phenolate linked to the benzotriazole phenolate base molecule by an oxygen, carbon-based, nitrogen-based, or sulfur-based linking group. Examples of this second type of compound are described by Formula II below:

Formula II

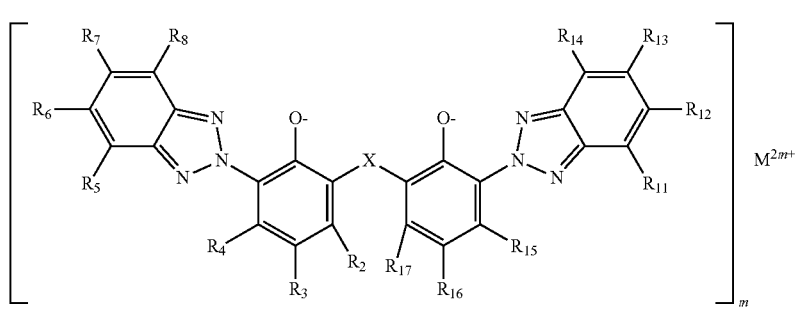

The structure of Formula II can be viewed as compound of Formula I where the $R^1$ group is an —X—$R^9$ group an X is a linking group comprising an —O—, —NR$^{10}$—, —S—, —S(O)—, —S(O)$_2$—, or —CH$_2$—, where S(O) is a sulfinyl group S=O, S(O)$_2$ is a sulfonyl group O=S=O, and where $R^{10}$ comprises a hydrogen atom, an alkyl group, or an aryl group. The $R^9$ group in these embodiments is another benzotriazole phenolate group, which may be the same or different from the base benzotriazole phenolate group. In these embodiments, each $R^2$, $R^3$, $R^4$, $R^5$, $R^6$, $R^7$, $R^8$, $R^{11}$, $R^{12}$, $R^{13}$, $R^{14}$, $R^{15}$, $R^{16}$, and $R^{17}$, independently comprises a hydrogen atom, an alkyl group, an alkenyl group, an aryl group, or a halogen atom.

In Formula II, M is a metal ion with a valency of 2 m, and m also describes the stoichiometry of the anionic portion of the salt. In this instance, m can be a non-integer number, selected from 0.5, 1.0, or 2. If m is 0.5, the metal salt M is monovalent metal (2 m=1) and the stoichiometry of the anionic portion is 0.5 (i.e. one half the anionic portion per M, or 2 M ions per 1 anionic portion). If m is 1, the metal salt M is a divalent metal ion and the stoichiometry of the anionic portion is 1. If m is 2, the metal salt M is a tetravalent metal ion and the stoichiometry of the anionic portion is 2, meaning that two anions are present per M ion. Typically, the cationic portion of the salt, M, is a metallic cation with a valency of 1 or 2. In embodiments where M is monovalent, the M is lithium, sodium or potassium. In embodiments where M is divalent, M is calcium, magnesium, or cobalt. In some embodiments, M is a tetravalent metal ion (m=2) or titanium or vanadium.

In some embodiments of the compounds of Formula II, X comprises an —$NR^{10}$— linking group where $R^{10}$ comprises a hydrogen atom, or an alkyl group comprising 1-3 carbon atoms. Typically in these embodiments, the $R^3$ and $R^{16}$ groups are substituent groups, where $R^3$ and $R^{16}$ each comprise an alkyl group with 1-20 carbon atoms. Typically, each $R^2$, $R^4$, $R^5$, $R^6$, $R^7$, $R^8$, $R^{11}$, $R^{12}$, $R^{13}$, $R^{14}$, $R^{15}$, and $R^{17}$, is a hydrogen atom.

In one particular embodiment, X comprises an —$NR^{10}$— linking group where $R^{10}$ comprises a hydrogen atom, the $R^3$ and $R^{16}$ groups are alkyl groups with 8 carbon atoms, typically iso-octyl groups, and each $R^2$, $R^4$, $R^5$, $R^6$, $R^7$, $R^8$, $R^{11}$, $R^{12}$, $R^{13}$, $R^{14}$, $R^{15}$, and $R^{17}$, is a hydrogen atom.

In another particular embodiment, X comprises an —$NR^{10}$— linking group where $R^{10}$ comprises an alkyl group with 1 carbon atom (a methyl group), the $R^3$ and $R^{16}$ groups are alkyl groups with 8 carbon atoms, typically iso-octyl groups, and each $R^2$, $R^4$, $R^5$, $R^6$, $R^7$, $R^8$, $R^{11}$, $R^{12}$, $R^{13}$, $R^{14}$, $R^{15}$, and $R^{17}$, is a hydrogen atom.

In some embodiments of the compounds of Formula II, X comprises an —O— linking group. Typically in these embodiments, the $R^3$ and $R^{16}$ groups are substituent groups, where $R^3$ and $R^{16}$ each comprise an alkyl group with 1-20 carbon atoms. Typically, each $R^2$, $R^4$, $R^5$, $R^6$, $R^7$, $R^8$, $R^{11}$, $R^{12}$, $R^{13}$, $R^{14}$, $R^{15}$, and $R^{17}$, is a hydrogen atom.

In one particular embodiment, X comprises an —O— linking group, the $R^3$ and $R^{16}$ groups are alkyl groups with 8 carbon atoms, typically iso-octyl groups, and each $R^2$, $R^4$, $R^5$, $R^6$, $R^7$, $R^8$, $R^{11}$, $R^{12}$, $R^{13}$, $R^{14}$, $R^{15}$, and $R^{17}$, is a hydrogen atom.

In some embodiments of the compounds of Formula II, X comprises a —S— linking group. Typically in these embodiments, the $R^3$ and $R^{16}$ groups are substituent groups, where $R^3$ and $R^{16}$ each comprise an alkyl group with 1-20 carbon atoms. Typically, each $R^2$, $R^4$, $R^5$, $R^6$, $R^7$, $R^8$, $R^{11}$, $R^{12}$, $R^{13}$, $R^{14}$, $R^{15}$, and $R^{17}$, is a hydrogen atom.

In one particular embodiment, X comprises a —S— linking group, the $R^3$ and $R^{16}$ groups are alkyl groups with 8 carbon atoms, typically iso-octyl groups, and each $R^2$, $R^4$, $R^5$, $R^6$, $R^7$, $R^8$, $R^{11}$, $R^{12}$, $R^{13}$, $R^{14}$, $R^{15}$, and $R^{17}$, is a hydrogen atom.

In some embodiments, X comprises a methylene group —$CH_2$—. Typically in these embodiments, the $R^3$ and $R^{16}$ groups are substituent groups, where $R^3$ and $R^{16}$ each comprise an alkyl group with 1-20 carbon atoms. Typically, each $R^2$, $R^4$, $R^5$, $R^6$, $R^7$, $R^8$, $R^{11}$, $R^{12}$, $R^{13}$, $R^{14}$, $R^{15}$, and $R^{17}$, is a hydrogen atom. In a particular embodiment, $R^3$ and $R^{16}$ each comprise an iso-octyl group. The phenol from which this salt is prepared is commercially available as TINUVIN 360 from BASF, Ludwigshafen, Germany.

The charge-enhancing additive or combination of additives can be added in any suitable amount. The charge-enhancing additives of this disclosure have been shown to be effective even in relatively small quantities. Typically the charge-enhancing additive or combination of additives is present in a thermoplastic resin and charge-enhancing additive or additives blend in amounts of up to about 10% by weight, more typically in the range of 0.02 to 5% by weight based upon the total weight of the blend. In some embodiments, the charge-enhancing additive or combination of additives is present in an amount ranging from 0.1 to 3% by weight, 0.1 to 2% by weight, 0.2 to 1.0% by weight, or 0.25 to 0.5% by weight.

The blend of the thermoplastic resin and the charge-enhancing additive or combination of additives can be prepared by well-known methods. Typically, the blend is processed using melt extrusion techniques, so the blend may be preblended to form pellets in a batch process, or the thermoplastic resin and the charge-enhancing additive or additives may be mixed in the extruder in a continuous process. Where a continuous process is used, the thermoplastic resin and the charge-enhancing additive or additives may be pre-mixed as solids or added separately to the extruder and allowed to mix in the molten state.

Examples of melt mixers that may be used to form preblended pellets include those that provide dispersive mixing, distributive mixing, or a combination of dispersive and distributive mixing. Examples of batch methods include those using a BRABENDER (e.g. a BRABENDER PREP CENTER, commercially available from C.W. Brabender Instruments, Inc.; South Hackensack, N.J.) or BANBURY internal mixing and roll milling equipment (e.g. equipment available from Farrel Co.; Ansonia, Conn.). After batch mixing, the mixture created may be immediately quenched and stored below the melting temperature of the mixture for later processing.

Examples of continuous methods include single screw extruding, twin screw extruding, disk extruding, reciprocating single screw extruding, and pin barrel single screw extruding. The continuous methods can include utilizing both distributive elements, such as cavity transfer mixers (e.g. CTM, commercially available from RAPRA Technology, Ltd.; Shrewsbury, England) and pin mixing elements, static mixing elements or dispersive mixing elements (commercially available from e.g., MADDOCK mixing elements or SAXTON mixing elements).

Examples of extruders that may be used to extrude preblended pellets prepared by a batch process include the same types of equipment described above for continuous processing. Useful extrusion conditions are generally those which are suitable for extruding the resin without the additive.

The extruded blend of thermoplastic resin and charge-enhancing additive or additives may be cast or coated into films or sheets or may be formed into a fibrous web using any suitable techniques. Films can be made into a variety of articles including filtration media by the methods described in, for example, U.S. Pat. No. 6,524,488 (Insley et al.). Fibrous webs can be made from a variety of fiber types including, for example, melt-blown microfibers, staple fibers, fibrillated films, and combinations thereof. Techniques for preparing fibrous webs include, for example, air laid processes, wet laid processes, hydro-entanglement, spunbond processes, melt-blown processes, and combinations thereof. Melt-blown and spunbond, non-woven microfibrous webs are particularly useful as filtration media.

Melt-blown and spunbond, non-woven microfibrous electret filters are especially useful as an air filter element of a respirator, such as a filtering facepiece, or for such purposes as home and industrial air-conditioners, air cleaners, vacuum cleaners, medical air line filters, and air conditioning systems for vehicles and common equipment, such as computers, computer disk drives and electronic equipment. In some embodiments, the electret filters are combined with a respirator assembly to form a respiratory device designed to be used by a person. In respirator uses, the electret filters may be in the form of molded, pleated, or folded half-face respirators, replaceable cartridges or canisters, or prefilters.

Melt-blown microfibers useful in the present disclosure can be prepared as described in Van A. Wente, "Superfine Thermoplastic Fibers," Industrial Engineering Chemistry, vol. 48, pp. 1342-1346 and in Report No. 4364 of the Naval Research Laboratories, published May 25, 1954, entitled "Manufacture of Super Fine Organic Fibers" by Van A. Wente et al.

Spunbond microfibers may be formed using a spunbond process in which one or more continuous polymeric free-fibers are extruded onto a collector, as described, for example, in U.S. Pat. Nos. 4,340,563 and 8,162,153 and US Patent Publication No. 2008/0038976.

Useful melt-blown and spunbond microfibers for fibrous electret filters typically have an effective fiber diameter (EFD) of from about 1-100 micrometers, more typically 2 to 30 micrometers, in some embodiments from about 7 to 15 micrometers, as calculated according to the method set forth in Davies, C. N., "The Separation of Airborne Dust and Particles," Institution of Mechanical Engineers, London, Proceedings 1B, 1952.

Staple fibers may also be present in the web. The presence of staple fibers generally provides a more lofty, less dense web than a web of only blown microfibers. Generally, no more than about 90 weight percent staple fibers are present, more typically no more than about 70 weight percent. Examples of webs containing staple fiber are disclosed in U.S. Pat. No. 4,118,531 (Hauser).

Sorbent particulate material such as activated carbon or alumina may also be included in the web. Such particles may be present in amounts up to about 80 volume percent of the contents of the web. Examples of particle-loaded webs are described, for example, in U.S. Pat. No. 3,971,373 (Braun), U.S. Pat. No. 4,100,324 (Anderson) and U.S. Pat. No. 4,429,001 (Kolpin et al.).

Various optional additives can be blended with the thermoplastic composition including, for example, pigments, light stabilizers, primary and secondary antioxidants, metal deactivators, hindered amines, hindered phenols, fatty acid metal salts, triester phosphites, phosphoric acid salts, fluorine-containing compounds, nucleating agents, and combinations thereof. In addition, antioxidants in some instances can also function as charge enhancing additives. Possible charge additives include thermally stable organic triazine compounds or oligomers, which compounds or oligomers contain at least one nitrogen atom in addition to those in the triazine ring, see, for example, U.S. Pat. Nos. 6,268,495, 5,976,208, 5,968,635, 5,919,847, and 5,908,598 to Rousseau et al. Another additive known to enhance electrets is "CHIMASSORB 944: (poly[[6-(1,1,3,3,-tetramethylbutyl) amino]-s-triazine-2,4-diyl][[(2,2,6,6-tetramethyl-4-piperidyl) imino] hexamethylene [(2,2,6,6-tetramethyl-4-piperidyl) imino]]), available from BASF, Ludwigshafen, Germany. The charge-enhancing additives may be N-substituted amino aromatic compounds, particularly tri-amino substituted compounds, such as 2,4,6-trianilino-p-(carbo-2'-ethylhexyl-1'-oxy)-1,3,5-triazine commercially available as "UVINUL T-150" from BASF, Ludwigshafen, Germany. Another charge additive is 2,4,6-tris-(octadecylamino)-triazine, also known as tristearyl melamine ("TSM"). Further examples of charge-enhancing additives are provided in U.S. Patent Application Ser. No. 61/058,029, U.S. Patent Application Ser. No. 61/058,041, U.S. Pat. No. 7,390,351 (Leir et al.), U.S. Pat. No. 5,057,710 (Nishiura et al.), and U.S. Pat. Nos. 4,652,282 and 4,789,504 (Ohmori et al.).

In addition the web may be treated to chemically modify its surface. Surface fluorination can be achieved by placing a polymeric article in an atmosphere that contains a fluorine-containing species and an inert gas and then applying an electrical discharge to modify the surface chemistry of the polymeric article. The electrical discharge may be in the form of a plasma such as an AC corona discharge. This plasma fluorination process causes fluorine atoms to become present on the surface of the polymeric article. The plasma fluorination process is described in a number of U.S. Pat. Nos. 6,397,458, 6,398,847, 6,409,806, 6,432,175, 6,562,112, 6,660,210, and 6,808,551 to Jones/Lyons et al. Electret articles that have a high fluorosaturation ratio are described in U.S. Pat. No. 7,244,291 to Spartz et al., and electret articles that have a low fluorosaturation ratio, in conjunction with heteroatoms, is described in U.S. Pat. No. 7,244,292 to Kirk et al. Other publications that disclose fluorination techniques include: U.S. Pat. Nos. 6,419,871, 6,238,466, 6,214,094, 6,213,122, 5,908,598, 4,557,945, 4,508,781, and 4,264,750; U.S. Publications US 2003/0134515 A1 and US 2002/0174869 A1; and International Publication WO 01/07144.

The electret filter media prepared according to the present disclosure generally have a basis weight (mass per unit area) in the range of about 10 to 500 $g/m^2$, and in some embodiments, about 10 to 100 $g/m^2$. In making melt-blown microfiber webs, the basis weight can be controlled, for example, by changing either the collector speed or the die throughput. The thickness of the filter medium is typically about 0.25 to 20 millimeters, and in some embodiments, about 0.5 to 2 millimeters. Multiple layers of fibrous electret webs are commonly used in filter elements. The solidity of the fibrous electret web typically is about 1% to 25%, more typically about 3% to 10%. Solidity is a unitless parameter that defines the solids fraction of the web. Generally the methods of this disclosure provide electret webs with generally uniform charge distribution throughout the web without regard to basis weight, thickness, or solidity of the medium. The electret filter medium and the resin from which it is produced should not be subjected to any unnecessary treatment which might increase its electrical conductivity, e.g., exposure to ionizing radiation, gamma rays, ultraviolet irradiation, pyrolysis, oxidation, etc.

The electret web may be charged as it is formed or the web may be charged after the web is formed. In electret filter medium, the medium is generally charged after the web is formed. In general, any standard charging method known in the art may be used. For example, charging may be carried out in a variety of ways, including tribocharging, corona discharge and hydrocharging. A combination of methods may also be used. As mentioned above, in some embodiments, the electret webs of this disclosure have the desirable feature of being capable of being charged by corona discharge alone, particularly DC corona discharge, without the need of additional charging methods.

Examples of suitable corona discharge processes are described in U.S. Pat. Re. No. 30,782 (van Turnhout), U.S. Pat. Re. No. 31,285 (van Turnhout), U.S. Pat. Re. No. 32,171 (van Turnhout), U.S. Pat. No. 4,215,682 (Davis et al.), U.S. Pat. No. 4,375,718 (Wadsworth et al.), U.S. Pat. No. 5,401,446 (Wadsworth et al.), U.S. Pat. No. 4,588,537 (Klaase et al.), U.S. Pat. No. 4,592,815 (Nakao), and U.S. Pat. No. 6,365,088 (Knight et al.).

Another technique that can be used to charge the electret web is hydrocharging. Hydrocharging of the web is carried out by contacting the fibers with water in a manner sufficient to impart a charge to the fibers, followed by drying of the web. One example of hydrocharging involves impinging jets of water or a stream of water droplets onto the web at a pressure sufficient to provide the web with filtration enhancing electret charge, and then drying the web. The pressure necessary to achieve optimum results varies depending on the type of sprayer used, the type of polymer from which the web is formed, the type and concentration of additives to the polymer, the thickness and density of the web and whether pre-treatment, such as corona surface treatment, was carried out prior to hydrocharging. Generally, water pressures in the range of about 10 to 500 psi (69 to 3450 kPa) are suitable. The jets of water or stream of water droplets can be provided by any suitable spray device. One example of a useful spray device is the apparatus used for hydraulically entangling fibers. An example of a suitable method of hydrocharging is described in U.S. Pat. No. 5,496,507 (Angadjivand et al.). Other methods are described in U.S. Pat. No. 6,824,718 (Eitzman et al.), U.S. Pat. No. 6,743,464 (Insley et al.), U.S. Pat. No. 6,454,986 (Eitzman et al.), U.S. Pat. No. 6,406,657 (Eitzman et al.), and U.S. Pat. No. 6,375,886 (Angadjivand et al.). The hydrocharging of the web may also be carried out using the method disclosed in the U.S. Pat. No. 7,765,698 (Sebastian et al.).

To assess filtration performance, a variety of filtration testing protocols has been developed. These tests include measurement of the aerosol penetration of the filter web using a standard challenge aerosol such as dioctylphthalate (DOP), which is usually presented as percent of aerosol penetration through the filter web (% Pen) and measurement of the pressure drop across the filter web ($\Delta P$). From these two measurements, a quantity known as the Quality Factor (QF) may be calculated by the following equation:

$$QF=-\ln(\% \text{ Pen}/100)/\Delta P,$$

where ln stands for the natural logarithm. A higher QF value indicates better filtration performance, and decreased QF values effectively correlate with decreased filtration performance. Details for measuring these values are presented in the Examples section. Typically, the filtration medium of this disclosure have measured QF values of 0.3 (mm of $H_2O)^{-1}$ or greater at a face velocity of 6.9 centimeters per second.

To verify that a particular filter medium is electrostatically charged in nature, one may examine its performance before and after exposure to ionizing X-ray radiation. As described in the literature, for example, *Air Filtration* by R. C. Brown (Pergamon Press, 1993) and "Application of Cavity Theory to the Discharge of Electrostatic Dust Filters by X-Rays", A. J. WAKER and R. C. BROWN, *Applied Radiation and Isotopes*, Vol. 39, No. 7, pp. 677-684, 1988, if an electrostatically charged filter is exposed to X-rays, the penetration of an aerosol through the filter will be greater after exposure than before exposure, because the ions produced by the X-rays in the gas cavities between the fibers will have neutralized some of the electric charge. Thus, a plot of penetration against cumulative X-ray exposure can be obtained which shows a steady increase up to a constant level after which further irradiation causes no change. At this point all of the charge has been removed from the filter.

These observations have led to the adoption of another testing protocol to characterize filtration performance, the X-ray Discharge Test. In this testing protocol, select pieces of the filter medium to be tested are subjected to X-ray radiation to discharge the electret web. One attribute of this test is that it confirms that the web is an electret. Because it is known that X-rays quench electret charge, exposure of a filter medium to X-rays and measuring the filter performance before and after this exposure and comparing the filter performances indicates whether the filter medium is an electret. If the filter performance is unchanged after exposure to X-ray radiation, that is indicative that no charge was quenched and the material is not an electret. However, if the filter performance diminishes after exposure to X-ray radiation, that is indicative that the filter medium is an electret.

When the test is run, typically, the filtration performance is measured before and after exposure of the filter medium to the X-ray radiation as described in detail in U.S. Pat. No. 8,790,449. A % Penetration Ratio can be calculated according to the following equation: % Penetration Ratio=(ln (initial % DOP Penetration/100)/(ln(% DOP Penetration after 60 min of X-ray exposure/100)))×100, when tested according to the Filtration Performance Test Method, as described in the Examples section below. In order for the web to have sufficient charge for use as a filter, the % Penetration Ratio is typically at least 300%. As the % Penetration Ratio increases, the filtration performance of the web also increases. In some embodiments, the % Penetration Ratio is at least 400%, 500%, or 600%. In preferred embodiments, the % Penetration Ratio is at least 750% or 800%. In some embodiments, the web exhibits a % Penetration Ratio of at least 1000%, or at least 1250%.

The initial Quality Factor (prior to exposure to X-rays) is typically at least 0.3 (mm of $H_2O)^{-1}$, more typically at least 0.4 or even 0.5 (mm of $H_2O)^{-1}$ for a face velocity of 6.9 cm/s when tested according to the Filtration Performance Test Method, as described in the Examples section below. In some embodiments, the initial Quality Factor is at least 0.6 or 0.7 (mm of $H_2O)^{-1}$. In other embodiments, the initial Quality Factor is at least 0.8, at least 0.90, at least 1.0, or even greater than 1.0 (mm of $H_2O)^{-1}$. The Quality Factor after 60 minutes exposure to X-rays is typically less than 50% of the initial Quality Factor. In some embodiments, the initial Quality Factor is at least 0.5 (mm of $H_2O)^{-1}$ or greater and the Quality Factor after 60 minutes exposure to X-rays is less than 0.15 (mm of $H_2O)^{-1}$.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents were Alfa Aesar (Chem-Seal grade) and were used with no further purification. Solvents that were used in separations, isolations, chromatography, and other general use were obtained from EMD (Omnisolv Grade).

The following abbreviations are used throughout the Examples: M=molar; min=minutes; h=hours; equiv=equivalents; x=times; g=grams; mg=milligrams; mmol=millimoles; L=liters; mL=milliliters; rt=room temperature; aq=aqueous; RBF=round bottom flask.

Materials

The following is a table of commercially available materials and reagents that were used.

| Compound | Supplier |
|---|---|
| Bases | |
| sodium ethoxide (ca. 20% in Ethanol) | TCI America |
| sodium tert-butoxide | TCI America |
| n-butyllithium (1.6M in hexanes) | Sigma-Aldrich |
| potassium carbonate | EMD Millipore |
| cesium carbonate | Alfa Aesar |
| potassium hydroxide | EMD Millipore |
| Trimethylamine | Sigma-Aldrich |
| sodium bicarbonate | Sigma-Aldrich |
| ammonium chloride | VWR |
| Oxidants | |
| 1,3-Dibromo-5,5-dimethylhydantoin | Alfa Aesar |
| urea hydrogen peroxide adduct | Alfa Aesar |
| m-chloroperoxybenzoic acid | Alfa Aesar |
| Ligands | |
| 2-(Dicyclohexylphosphino)-2',4',6'-tri-i-propyl-1,1'-biphenyl (XPhos) | Strem |
| 2-(Di-t-butylphosphino)-3-methoxy-6-methyl-2'-4'-6'-tri-i-propyl-1,1'-biphenyl (RockPhos) | Strem |
| 2-(Di-t-butylphosphino)-3,6-dimethoxy-2',4',6'-tri-i-propyl-1,1'-biphenyl (t-buBrettPhos) | Strem |
| 1,1'bis(diphenylphospino)ferrocene | Strem |
| Catalysts | |
| tris(dibenzylideneacetone)dipalladium | Strem |
| palladium acetate | TCI America |
| allylpalladium(II) chloride dimer | Lancaster |
| copper acetate | Alfa Aesar |
| Methanesulfonato(2-(di-t-butylphosphino)-3,6-dimethoxy-2',4',6'-tri-i-propyl-1,1'-biphenyl)(2'-amino-1,1'-biphenyl-2-yl)palladium(II) (XPhos Precatalyst) | Strem |
| Methanesulfonato(2-(di-t-butylphosphino)-3-methoxy-6-methyl-2',4',6'-tri-i-propyl-1,1'-biphenyl)(2'-amino-1,1'-biphenyl-2-yl)palladium(II) (RockPhos Precatalyst) | Strem |
| Methanesulfonato(2-(di-t-butylphosphino)-3,6-dimethoxy-2',4',6'-tri-i-propyl-1,1'-biphenyl)(2'-amino-1,1'-biphenyl-2-yl)palladium(II) (t-BuBrettPhos Precatalyst) | Strem |
| Reagents | |
| p-tolylboronic acid | Aldrich Chemical |
| Trimethylborate | Alfa Aesar |
| Iodomethane | Alfa Aesar |
| triisopropylchlorosilane | Alfa Aesar |
| boron tribromide | Sigma-Aldrich |
| thionyl chloride | Alfa Aesar |
| trifluoromethanesulfonic anhydride | Oakwood |
| 2-(2H-Benzotriazol-2-yl)-4-(1,1,3,3-tetramethylbutyl)phenol | TCI America |
| m-cresol | Alfa Aesar |
| n-butanol | Sigma-Aldrich |
| methylamine hydrochloride | Aldrich Chemical |
| 4-n-hexylaniline | Alfa Aesar |
| Hexylamine | Alfa Aesar |
| ammonia (0.5M in dioxane) | Sigma Alrich |
| scandium triflate | Strem |
| potassium thioacetate | Alfa Aesar |
| 3,5-bis(trifluoromethyl)aniline | Alfa Aesar |
| 1-bromo-4-(heptadecafluorooctyl)benzene | Sigma Aldrich |
| 1-iodooctadecane | Alfa Aesar |

Structural Formulas of Phenol Compounds Disclosed

The table below presents a summary of the structural formulas for the phenol compounds used in this application to prepare phenolate salts. The phenols are either commercially available or prepared in the Synthesis Examples below.

| Name | Source | Structure |
|---|---|---|
| Phenol-1 | Commercially available | *(benzotriazolyl-methylphenol structure)* |
| Phenol-2 | Commercially Available | *(benzotriazolyl-allyl-methylphenol structure)* |

-continued
| Name | Source | Structure |
|---|---|---|
| Phenol-3 | Commercially Available | 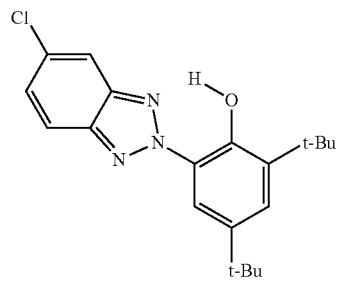 [SMILES: CC(C)(C)c1cc(-n2nc3ccc(Cl)cc3n2)c(O)c(C(C)(C)C)c1] |
| Phenol-4 | Synthesis Example SE2 | 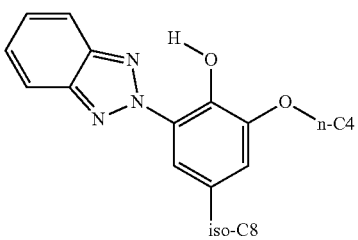 |
| Phenol-5 | Synthesis Example SE4 | 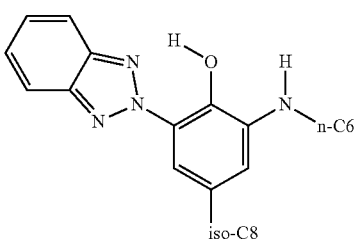 |
| Phenol-6 | Synthesis Example SE3 | 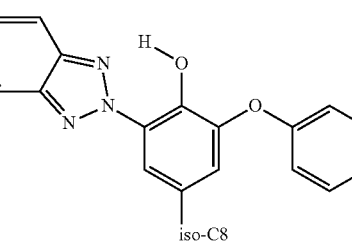 |
| Phenol-7 | Commercially Available | 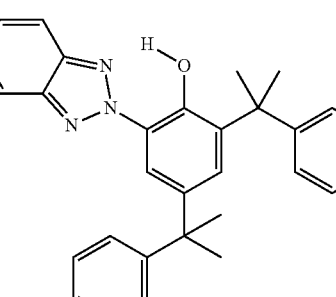 |
| Phenol-8 | Synthesis Example SE5 | 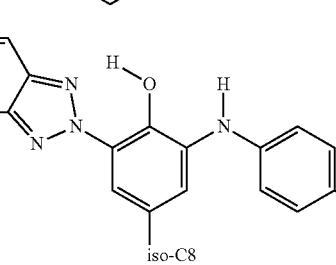 |

-continued

| Name | Source | Structure |
|---|---|---|
| Phenol-9 | Commercially Available | (structure: methylene-bridged bis(2-(2H-benzotriazol-2-yl)-4-iso-C8-phenol)) |
| Phenol-10 | Synthesis Example SE6 | (structure: NH-bridged bis(2-(2H-benzotriazol-2-yl)-4-iso-C8-phenol)) |
| Phenol-11 | Synthesis Example SE7 | (structure: N(CH3)-bridged bis(2-(2H-benzotriazol-2-yl)-4-iso-C8-phenol)) |
| Phenol-12 | Synthesis Example SE8 | (structure: S-bridged bis(2-(2H-benzotriazol-2-yl)-4-(1,1,3,3-tetramethylbutyl)-phenol)) |
| Phenol-13 | Commercially Available | (structure: 2-(5-trifluoromethyl-2H-benzotriazol-2-yl)-6-(2-phenylpropan-2-yl)-4-(1,1,3,3-tetramethylbutyl)phenol) |
| Phenol-14 | Synthesis Example SE9 | (structure: 2-(2H-benzotriazol-2-yl)-6-((3,5-bis(trifluoromethyl)phenyl)amino)-4-(1,1,3,3-tetramethylbutyl)phenol) |

| Name | Source | Structure |
|---|---|---|
| Phenol-15 | Synthesis Example SE10 | |
| Phenol-16 | Synthesis Example SE11 | |
| Phenol-17 | Synthesis Example SE12 | |
| Phenol-18 | Synthesis Example SE13 | |

General Synthesis of Phenols

In the examples below automated flash chromatography (AFC) was carried out using an ISOLERA system available from Biotage, Inc, Charlottesville, Va., USA. For these purifications Biotage SNAP Ultra silica columns were used with a hexane/ethyl acetate gradient mixture.

All intermediates and products were confirmed using $^1$H and $^{13}$C Nuclear Magnetic Resonance (NMR) on a 500 MHz Bruker instrument. In some cases HRMS was also obtained.

A General Reaction Scheme I is presented below which was followed to prepare the compounds of this disclosure. Specific details are provided for each Synthesis Example.

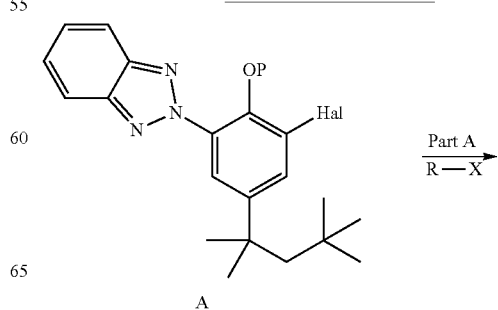

General Reaction Scheme I.

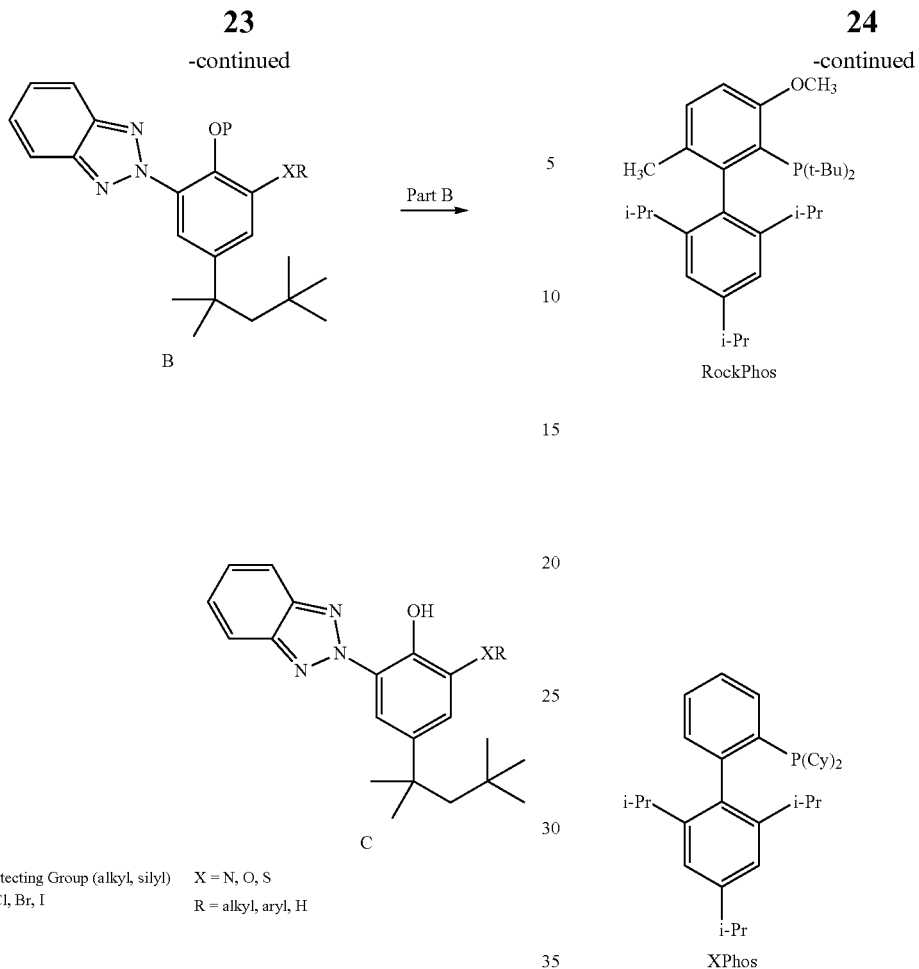

P = Protecting Group (alkyl, silyl)   X = N, O, S
Hal = Cl, Br, I                       R = alkyl, aryl, H Part A: Cross-Coupling. Protected phenol A is subjected to cross-coupling conditions with either a palladium or copper catalyst. For specific reaction conditions, see each individual example.

Palladium Catalysis (Buchwald-Hartwig Cross-Coupling):

Buchwald, Hartwig, and coworkers have reported in the literature a transformation in which aryl halides can be converted to heteroatoms by use of a palladium catalyst and a bulky phosphine ligand. The following commercially available ligands (developed by Buchwald) have been used to synthesize benzotriazole phenolic analogs in which a heteroatom has been introduced in the ortho position (see compound B). These ligands can also be purchased already complexed to the palladium catalyst and are referred to as precatalysts.

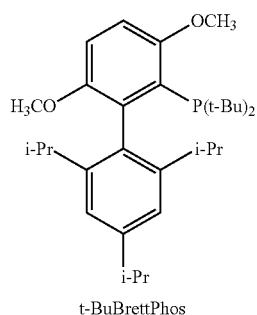

t-BuBrettPhos

RockPhos

XPhos

Copper Catalysis (Chan-Evans-Lam Coupling):

Copper can also be used to effect cross-coupling reactions between arylboronic acids and phenols, anilines, or arylthiols. This is considered to be a modification of the Ullmann condensation, as described in Kürti, L.; Czakó. *Strategic Applications of Named Reactions in Organic Synthesis*, 1$^{st}$ ed. Burlington: MA, 2005, pp. 464-465. The reaction is stoichiometric in copper salts and is typically performed under ambient conditions.

Part B: Deprotection of Methyl Ether. The methoxy ether benzotriazole (B, P=Me) was dissolved in dichloromethane (0.1 M) and cooled to −78° C. while stirring under $N_2$. Boron tribromide (1 equivalent per protected phenol) was added dropwise and the reaction mixture allowed to slowly warm to room temperature. When the reaction was complete (analysis by TLC), water was added dropwise and the mixture was stirred for 10 min. The organic layer was separated and the aqueous layer extracted with DCM (2×). The combined organic layers were washed with saturated aqueous $NaHCO_3$ and brine, dried ($Na_2SO_4$ or $MgSO_4$), filtered and concentrated. The residue was purified ($SiO_2$) to give products in 78-98% yield.

Note that in the following Synthesis Examples, compounds that are referred to as "Ethers" are protected phenols, meaning that the —OH group is instead a "protected hydroxyl group" i.e. a —$OCH_3$ group, which is deprotected to reform the phenolic hydroxyl group.

Synthesis Example SE1: Ether-1

2-(3-bromo-2-methoxy-5-(2,4,4-trimethylpentan-2-yl)phenyl)-2H-1,2,3-benzotriazole

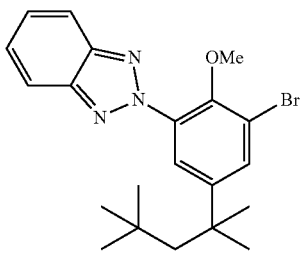 [SMILES: COc1c(Br)cc(C(C)(C)CC(C)(C)C)cc1-n1nc2ccccc2n1]

Part A: Bromination. 2-(2H-Benzotriazol-2-yl)-4-(1,1,3,3-tetramethylbutyl)phenol (100 g, 309 mmol) was placed in a 1 L round bottom flask fitted with a stir bar and dissolved in chloroform (500 mL). To this was added 1,3-dibromo-5,5-dimethylhydantoin (DBDMH) (45.95 g, 161 mmol) and the mixture stirred rt overnight. After such time, the mixture was filtered and concentrated to give a dark red residue. The residue was recrystallized from dichloromethane/ethanol to obtain white crystals. Multiple recrystallizations of the mother liquor yielded 113 g of pure product (91% yield).
Part B: Methylation. The reaction product from Part A was placed in a 1 L round bottom flask fitted with a stir bar and dissolved in acetonitrile (400 mL). Potassium carbonate (20.70 g, 150 mmol) was added followed by iodomethane (3.3 mL, 52.5 mmol). The mixture stirred rt overnight. After such time, the reaction mixture was partially concentrated, diluted with ethyl acetate and filtered over celite. The solution was concentrated, giving a thick beige oil, which eventually solidified over time to give 20.8 g (quantitative yield) of product.

Synthesis Example SE2: Phenol-4

2-(2H-1,2,3-benzotriazol-2-yl)-6-butoxy-4-(2,4,4-trimethylpentan-2-yl)phenol

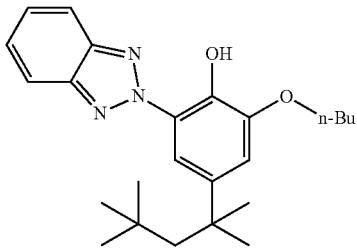

Into three flame dried 40-dram vials, each equipped with a stir bar and activated 4 Å molecular sieves was placed Ether 1 prepared in Synthesis Example SE1, (4.179 g, 10.04 mmol), cesium carbonate (4.91 g, 15.06 mmol), allylpalladium chloride dimer (18.4 mg, 0.5 mol %), and RockPhos ligand (23.4 mg, 0.5 mol %). Each vial was fitted with a septa cap and evacuated and backfilled with $N_2$ (3×). Toluene (10 mL), followed by anhydrous n-butanol (1.8 mL, 20.08 mmol) was added to each vial. The vials were placed on a ChemGlass reaction block and heated to 100° C. for 72 h. After such time, the reaction mixtures were combined, filtered over celite, and concentrated. The crude residue was purified via flash column chromatography to give a pale yellow solid (9.80 g, 79% yield). Following Part B (General Reaction Scheme I), the free phenol was isolated as a beige solid after purification by flash column chromatography (8.50 g, 85% yield).

Synthesis Example SE3: Phenol-6

2-(2H-1,2,3-benzotriazol-2-yl)-6-(m-tolyloxy)-4-(2,4,4-trimethylpentan-2-yl)phenol

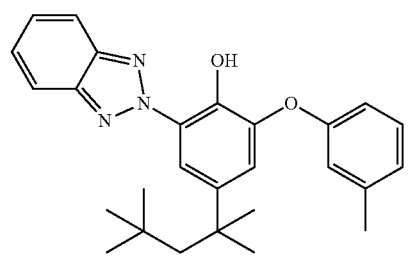 [SMILES: Cc1cccc(Oc2cc(C(C)(C)CC(C)(C)C)cc(-n3nc4ccccc4n3)c2O)c1]

Into two flame dried 40-dram vials, each equipped with a stir bar and activated 4 Å mol sieves was placed Ether 1 prepared in Synthesis Example SE1, (4.16 g, 10 mmol), potassium phosphate (4.25 g, 20 mmol), palladium(II) acetate (45 mg, 2 mol %), and RockPhos ligand (93 mg, 2 mol %). Each vial was fitted with a septa cap and evacuated and backfilled with $N_2$ (3×). Toluene (10 mL), followed by m-cresol (1.3 mL, 12 mmol) was added to each vial. The vials were placed on a ChemGlass reaction block and heated to 100° C. for 16 h. After such time, the reaction mixtures were combined, filtered over celite, and concentrated. The crude residue was purified via flash column chromatography to give a beige solid (7.07 g, 80% yield). Following Part B (General Reaction Scheme I), the free phenol was isolated as a beige solid after purification by flash column chromatography (6.50 g, 98% yield).

Synthesis Example SE4: Phenol-5

2-(2H-benzo[d][1,2,3]triazol-2-yl)-6-(hexylamino)-4-(2,4,4-trimethylpentan-2-yl)phenol

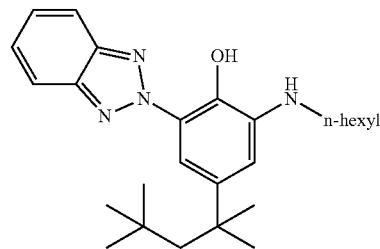

Into three flame dried vials equipped with a stir bar was placed Ether 1 prepared in Synthesis Example SE1, (1.66 g, 4 mmol), tris(dibenzylideneacetone)dipalladium(0) (73.3 mg, 0.08 mmol), XPhos ligand (95.3 mg, 0.2 mmol), sodium tert-butoxide (538 mg, 5.6 mmol), and 1-hexylamine (0.74 mL, 5.6 mmol). The vial was fitted with a septa cap and evacuated and backfilled with $N_2$. Dioxane (20 mL) was added and the reaction was heated to 130° C. for 16 h. After such time, the mixtures were cooled to rt, combined, diluted with EtOAc and filtered over celite. The residue was purified via AFC. A beige solid was isolated (3.88 g, 74% yield). Following Part B (General Reaction Scheme I), gave the free phenol as a yellow solid (3.32, 88% yield).

Synthesis Example SE5: Phenol-8

2-(2H-benzo[d][1,2,3]triazol-2-yl)-6-((4-hexylphenyl)amino)-4-(2,4,4-trimethylpentan-2-yl)phenol

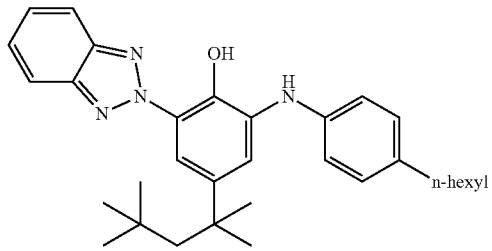

Into three flame dried vials equipped with a stir bar was placed Ether 1 prepared in Synthesis Example SE1, (1.66 g, 4 mmol), tris(dibenzylideneacetone)dipalladium(0) (73.3 mg, 0.08 mmol), XPhos ligand (95.3 mg, 0.2 mmol), sodium tert-butoxide (538 mg, 5.6 mmol), and 4-hexylaniline (1 mL, 5.6 mmol). The vial was fitted with a septa cap and evacuated and backfilled with $N_2$. Dioxane (20 mL) was added and the reaction was heated to 130° C. for 16 h. After such time, the mixtures were cooled to rt, combined, diluted with EtOAc and filtered over celite. The residue was purified via AFC. A beige solid was isolated (3.88 g, 74% yield). Following Part B (General Reaction Scheme I), gave the free phenol as a yellow solid (4.67 g, 96% yield).

Synthesis Example SE6: Phenol-10

6,6'-azanediylbis(2-(2H-benzo[d][1,2,3]triazol-2-yl)-4-(2,4,4-trimethylpentan-2-yl)phenol)

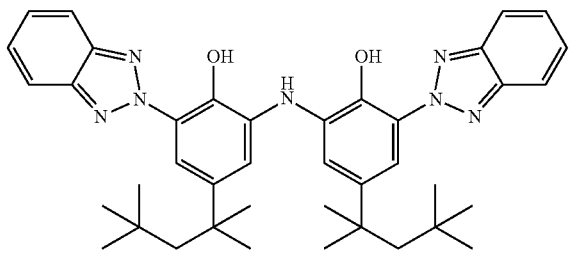 [SMILES: CC(C)(C)CC(C)(C)c1cc(Nc2cc(C(C)(C)CC(C)(C)C)cc(-n3nc4ccccc4n3)c2O)c(O)c(-n2nc3ccccc3n2)c1]

Part A. To an oven-dried Schlenk flask fitted with a stir bar was added 4 Å molecular sieves, sodium tert-butoxide (23.37 mmol, 2.25 g), $Pd_2(dba)_3$ (0.33 mmol, 306 mg), XPhos (0.83 mmol, 398 mg) and Ether 1 prepared in Synthesis Example SE1, (16.69 mmol, 6.95 g). The flask was then evacuated and flushed with $N_2$ (3×) and ammonia in dioxane (0.5 M, 100 mL) was added via cannula. The Schlenk flask was closed and heated to 130° C. for 16 h. After such time, the reaction mixture was diluted with EtOAc, filtered, and concentrated. The crude oil was purified via flash column chromatography to give a beige solid.

Part B. The product of Part A was dissolved in dichloromethane (150 mL) and cooled to -78° C. while stirring under $N_2$. Boron tribromide (17.10 mmol, 1.6 mL) was added dropwise and the reaction mixture allowed to slowly warm to rt. When the reaction was complete (analysis by TLC), water was added dropwise and the mixture was stirred for 10 min. The organic layer was separated and the aqueous layer extracted with DCM (2×). The combined organic layers were washed with saturated aqueous $NaHCO_3$ and brine, dried ($Na_2SO_4$ or $MgSO_4$), filtered and concentrated. The residue was recrystallized from hot acetone to give a yellow crystalline solid (3.38 g, 61% yield from Ether 1).

Synthesis Example SE7: Phenol-11

6,6'-(methylazanediyl)bis(2-(2H-benzo[d][1,2,3]triazol-2-yl)-4-(2,4,4-trimethylpentan-2-yl)phenol)

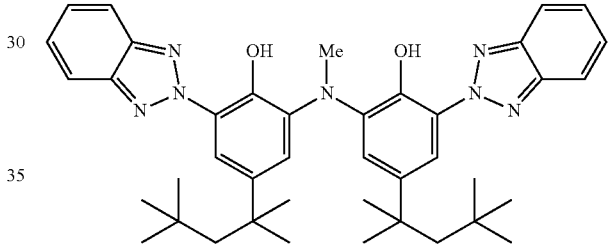

Part A. The reaction product from Synthesis Example SE6, Part A (12.79 mmol, 8.8 g) was dissolved in dimethylformamide (120 mL) and to this, sodium hydride (14.07 mmol, 0.56 g) was added under a stream of $N_2$ at rt. The mixture was stirred 10 min and then iodomethane (14.07 mmol, 0.88 mL) was added and stirring continued for another 2 h. The reaction was quenched with saturated aq ammonium chloride and extracted with EtOAc (3×). The combined organic layers were washed with water and then brine, dried with $Na_2SO_4$, filtered and concentrated. No further purification was performed.

Part B. The product of Part B was dissolved in dichloromethane (150 mL) and cooled to -78° C. while stirring under $N_2$. Boron tribromide (17.10 mmol, 1.6 mL) was added dropwise and the reaction mixture allowed to slowly warm to rt. When the reaction was complete (analysis by TLC), water was added dropwise and the mixture was stirred for 10 min. The organic layer was separated and the aqueous layer extracted with DCM (2×). The combined organic layers were washed with saturated aqueous $NaHCO_3$ and brine, dried ($Na_2SO_4$ or $MgSO_4$), filtered and concentrated. The residue was recrystallized from hot acetone to give a yellow crystalline solid (6.74 g, 60% yield from Ether 1).

Synthesis Example SE8: Phenol-12

6,6'-thiobis(2-(2H-benzo[d][1,2,3]triazol-2-yl)-4-(2,4,4-trimethylpentan-2-yl)phenol)

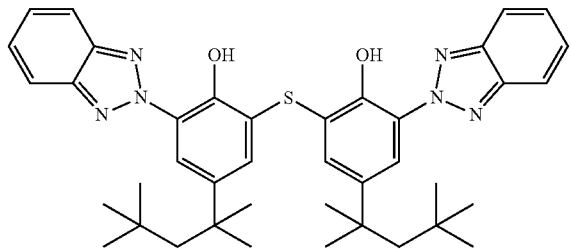 [SMILES: CC(C)(C)CC(C)(C)c1cc(Sc2cc(C(C)(C)CC(C)(C)C)cc(-n3nc4ccccc4n3)c2O)c(O)c(-n2nc3ccccc3n2)c1]

To a flame dried vial equipped with a stir bar was placed 3-bromo-2-methoxy-5-(2,4,4-trimethylpentan-2-yl)phenyl)-2H-1,2,3-benzotriazole (0.416 g, 1 mmol), potassium thioacetate (0.057 g, 0.5 mmol), Tris(dibenzylideneacetone)dipalladium(0) (0.023 g, 0.025 mmol), 1,1'-Bis(diphenylphosphino)ferrocene (0.028 g, 0.05 mmol) and potassium phosphate (0.127 g, 0.6 mmol). The vial was then evacuated and flushed with $N_2$ (3×) and toluene (0.5 mL) and acetone (0.25 mL) was added. The reaction mixture was stirred for 72 h at 130° C. After such time, the mixture was cooled, filtered, and purified by flash column chromatography to obtain 5 as a white solid (0.240 g, 68% yield). Following the procedure from Example 10, Part B, the product was obtained as a white solid (0.230 g, 99% yield).

Synthesis Example SE9: Phenol 14

2-(2H-benzotriazol-2-yl)-6-((3,5-bis(trifluoromethyl)phenyl)amino)-4-(2,4,4-trimethylpentan-2-yl)phenol

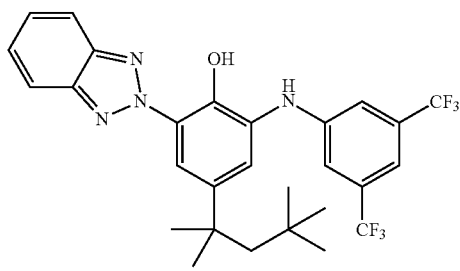 [SMILES: CC(C)(C)CC(C)(C)c1cc(Nc2cc(C(F)(F)F)cc(C(F)(F)F)c2)c(O)c(-n2nc3ccccc3n2)c1]

Into a 250 mL Schlenk flask equipped with a stir bar was placed Ether-1 from SE1, (20.0 g, 48.03 mmol), tris(dibenzylideneacetone)dipalladium(0) (1.04 g, 1.14 mmol), XPhos ligand (1.35 g, 2.75 mmol), sodium tert-butoxide (7.63 g, 79.4 mmol), and 3,5-bis(trifluoromethyl)aniline (8 mL, 51.36 mmol). The Schlenk flask evacuated and backfilled with $N_2$. Dioxane (200 mL) was added and the reaction was heated to 130° C. for 16 h. After such time, the mixture was cooled to rt, diluted with EtOAc, filtered over celite and concentrated. The residue was purified via AFC. A brown solid was isolated (26.8 g, 98% yield). Following Part B (General Reaction Scheme I), gave the free phenol as a yellow solid (21.3 g, 82% yield).

Synthesis Example SE10: Phenol 15

2-(2H-triazol-2-yl)-6-((4-(perfluorooctyl)phenyl)amino)-4-(2,4,4-trimethylpentan-2-yl)phenol

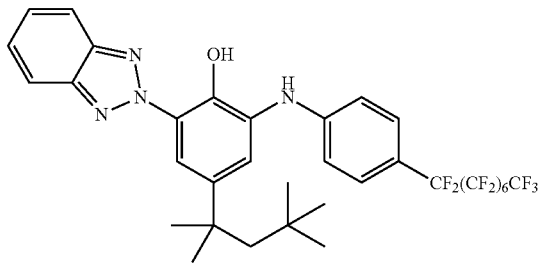

Into two flame dried 40-dram vials, each equipped with a stir bar was placed the aniline side product (3-(2H-benzo[d][1,2,3]triazol-2-yl)-2-methoxy-5-(2,4,4-trimethylpentan-2-yl)aniline) from SE8, Part A (1.162 g, 3.30 mmol), 1-bromo-4-(heptadecafluorooctyl)benzene (2.0 g, 3.30 mmol), tris(dibenzylideneacetone)dipalladium(0) (60.4 mg, 0.066 mmol), XPhos ligand (80 mg, 0.163 mmol), and sodium tert-butoxide (444 mg, 4.62 mmol). Each vial was fitted with a septa cap and evacuated and backfilled with $N_2$. Dioxane (20 mL) was added to each vial and the vials were placed on a ChemGlass reaction block and heated to 130° C. for 16 h. After such time, the mixtures were cooled to rt, diluted with EtOAc, combined, and filtered over celite and concentrated. The residue was purified via AFC. A brown solid was isolated (4.41 g, 79% yield). Following Part B (General Reaction Scheme I), gave the free phenol as a yellow solid (3.41 g, 79% yield).

Synthesis Example SE11: Phenol 16

6,6'-thiobis(2-(2H-benzo[d][1,2,3]triazol-2-yl)-4-(2,4,4-trimethylpentan-2-yl)phenol)

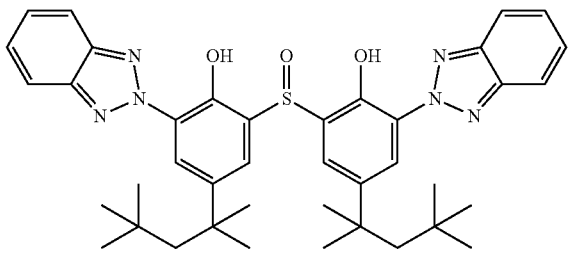 [SMILES: CC(C)(C)CC(C)(C)c1cc(-n2nc3ccccc3n2)c(O)c(S(=O)c2cc(C(C)(C)CC(C)(C)C)cc(-n3nc4ccccc4n3)c2O)c1]

6,6'-Thiobis(2-(2H-benzotriazol-2-yl)-4-(2,4,4-trimethylpentan-2-yl)phenol) from SE8 was oxidized using a literature procedure (Org Lett, 1999, 1, 189). 6,6'-Thiobis(2-(2H-benzotriazol-2-yl)-4-(2,4,4-trimethylpentan-2-yl)phenol) (7.39 mmol, 5.0 g) was dissolved in ethanol (5 mL) along with scandium triflate (0.74 mmol, 364 mg) and hydrogen peroxide.urea adduct (8.5 mmol, 820 mg). The reaction stirred at 80° C. overnight and the white precipitate was filtered and washed with water and ethanol. A 2:1 mixture of the sulfoxide:sulfone was isolated (4.18 g, 81% yield).

Synthesis Example SE12: Phenol 17

6,6'-sulfonylbis(2-(2H-benzotriazol-2-yl)-4-(2,4,4-trimethylpentan-2-yl)phenol)

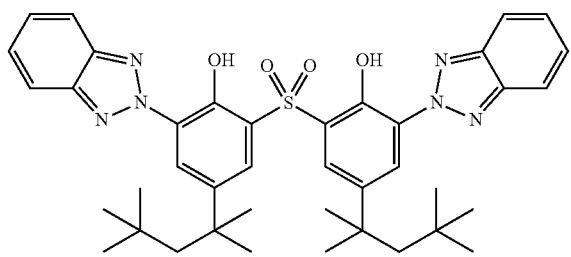 [SMILES: CC(C)(C)CC(C)(C)c1cc(-n2nc3ccccc3n2)c(O)c(S(=O)(=O)c2cc(C(C)(C)CC(C)(C)C)cc(-n3nc4ccccc4n3)c2O)c1]

6,6'-Sulfonylbis(2-(2H-benzotriazol-2-yl)-4-(2,4,4-trimethylpentan-2-yl)phenol) was synthesized in a similar fashion as Example 24. Aryl sulfide from SE10 (4.5 g, 6.6 mmol) was dissolved in dichloromethane (33 mL) in a flask equipped with a stir bar. m-Chloroperoxybenzoic acid, 50 wt % (7.40 mmol, 5.05 g) was added and the reaction stirred until complete by TLC. The reaction was then quenched with saturated aqueous $NaHCO_3$ and the organic layer separated, dried ($Na_2SO_4$), filtered, and concentrated. It was purified by washing with EtOAc and filtering. A white solid was obtained (2.9 g, 62% yield).

Synthesis Example SE13: Phenol 18

6,6'-(octadecylazanediyl)bis(2-(2H-benzotriazol-2-yl)-4-(2,4,4-trimethylpentan-2-yl)phenol)

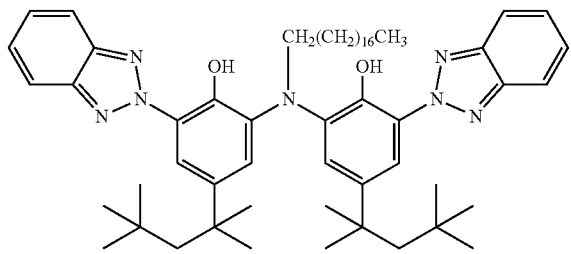

Part A. The reaction product from part A of SE8, (4.0 g, 5.81 mmol) was dissolved in dimethylformamide (60 mL) and to this, sodium hydride (6.40 mmol, 256 mg) was added under a stream of $N_2$ at rt. The mixture was stirred 10 min and then 1-iodooctadecane (6.40 mmol, 2.43 g) was added and stirring continued for another 2 h. The reaction was quenched with saturated aq ammonium chloride and extracted with EtOAc (3×). The combined organic layers were washed with water and then brine, dried with $Na_2SO_4$, filtered and concentrated. No further purification was performed.

Part B. The product of Part A was dissolved in dichloromethane (40 mL) and cooled to a temperature of −78° C. while stirring under $N_2$. Boron tribromide (12.20 mmol, 1.2 mL) was added dropwise and the reaction mixture allowed to slowly warm to rt. When the reaction was complete (analysis by TLC), water was added dropwise and the mixture was stirred for 10 min. The organic layer was separated and the aqueous layer extracted with DCM (2×). The combined organic layers were washed with saturated aqueous $NaHCO_3$ and brine, dried ($Na_2SO_4$ or $MgSO_4$), filtered and concentrated to give a viscous oil (5.16 g, 97% yield).

General Synthesis of Phenolate Salts

The above described phenols were used to prepare phenolate salts using one of the routes described below. The phenolate salts formed are summarized in Table 1 below by a listing of the metal cations for the prepared salts.

Synthetic Procedures

Alkoxide Route

Phenolic starting material is added to THF at 10-40% in a two-necked RBF equipped with a magnetic stir bar, condenser and addition funnel. The solution is stirred and heated to reflux until all of the phenolic starting material is dissolved under nitrogen. A stoichometric amount of metal alkoxide stock solution is added dropwise from the addition funnel to the RBF under nitrogen. The solution is refluxed from 1 to 36 hours. The solution is stripped with reduced pressure, and the recovered powder is dried in under vacuum.

Hydride Route

Anhydrous methanol is added to a dry, three-necked RBF equipped with a magnetic stir bar, reflux condenser, nitrogen inlet, and a stoppered port. The metal hydride is added to the RBF and refluxed under nitrogen for 30 minutes. The amount of hydride is used is added in 1-5% stoichiometric excess relative to the phenol being used, and the amount of phenol used is typically between 10-50% solids. After 30 minutes, the reaction is allowed to cool to room temperature and a stoichiometric amount of phenol is added the reaction by unstoppering the third port and adding the phenol in portions with a spatula. The reaction mixture is restoppered and stirred under nitrogen for 24 hours, at which point the reaction mixture is vacuum filtered and dried under vacuum. We have also prepared hypostoichometric compounds where less than the stoichiometric amount of cation is used and hyperstoichometric amounts where a stoichometric excess amount of cation is used.

Metal Route

The metal in its zero oxidation state was stirred with an alcohol in one flask, while the phenol was stirred in an appropriate organic solvent in a separate flask. Optionally, the metal may be activated by an activator, such as ammonia. A typical solvent was toluene. The solutions are combined into one flask once the metal was fully digested by the alcohol. The resulting precipitate was vacuum filtered, washed with methanol, and dried under vacuum.

Alternative Routes

Other alternative routes can be envisioned for making these complexes. These routes could include reacting the phenols with an organometallic, such as butyl lithium.

Materials

The following is a table of commercially available materials and reagents that were used to prepare the phenolate salts

| Material | Source | Supplied Form |
|---|---|---|
| $CaH_2$ | MP Biomedicals | Powder |
| $Mg(OCH_3)_2$ | Sigma-Aldrich | Powder |
| $Ca(OCH_3)_2$ | Sigma-Aldrich | Powder |
| $Li(OCH_3)$ | Sigma-Aldrich | 2.2M in methanol |
| $Na(OCH_2CH_3)$ | Alfa-Aesar | 21% w/v in ethanol |
| $K(OCH_3)$ | Sigma-Aldrich | 25% in methanol |
| Tetraethyl orthotitanate | TCI America | Liquid |
| Co(II) | Alfa-Aesar | 5% w/v in |

-continued

| Material | Source | Supplied Form |
|---|---|---|
| (OCH$_2$CH$_2$OCH$_3$)$_2$ | | methoxyethanol |
| Ca metal, granules | Alfa-Aesar | Granules |
| Methoxyethanol | Alfa-Aesar | Liquid |

TABLE 1

Phenolate Salts

| Phenol | Trade Name | Source | Phenolate Salts Prepared (Metal cation) |
|---|---|---|---|
| Phenol-1 | TINUVIN P | BASF | Na, Ti, K, |
| Phenol-2 | — | Sigma-Aldrich | Na |
| Phenol-3 | TINUVIN 327 | BASF | Na |
| Phenol-4 | — | Synthesis Example SE2 | Na |
| Phenol-5 | — | Synthesis Example SE4 | Na |
| Phenol-6 | — | Synthesis Example SE3 | Na |
| Phenol-7 | TINUVIN 234 | BASF | Na, K |
| Phenol-8 | — | Synthesis Example SE5 | Na |
| Phenol-9 | TINUVIN 360 | BASF | Na, Li, Ca, Mg, Co |
| Phenol-10 | — | Synthesis Example SE6 | Na, Ca |
| Phenol-11 | — | Synthesis Example SE7 | Ca |
| Phenol 12 | | Synthesis Example SE8 | Na, Ca |
| Phenol 13 | CGL-139 | CIBA | Na |
| Phenol 14 | — | Synthesis Example SE9 | Na |
| Phenol 15 | — | Synthesis Example SE10 | Na |
| Phenol 16 | — | Synthesis Example SE11 | Na, Ca |
| Phenol 17 | — | Synthesis Example SE12 | Na, Ca |
| Phenol 18 | — | Synthesis Example SE13 | Ca |

Preparation of Electret Webs and Electret Films

A series of electret articles, both flat films and non-woven webs, were prepared by compounding a polymeric resin or polymeric resin with phenolate salt and/or other additives.

TABLE 2

Materials Used for Resin Compounding

| Material Name | Trade Name | Source | Description |
|---|---|---|---|
| Additives | | | |
| Co-Additive-1 (CA-1) | Poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino] | BASF | Light Stabilizer |
| Co-Additive-2 (CA-2) | 1,3-propanediamine, N,N''-1,2-ethanediylbis-, polymer with 2,4,6-trichloro-1,3,5-triazine, reaction products with N-butyl-2,2,6,6-tetramethyl-4-piperidinamine | 3V-Sigma | Light Stabilizer |
| Polymer Resins | | | |
| PP1 | MF-650X | LyondellBasell | Polypropylene |
| PP2 | MF-650W | LyondellBasell | Polypropylene |
| PP3 | ACHIEVE 1550 MFI | ExxonMobil | Polypropylene |
| PP4 | TOTAL3860X | Total Petrochemicals | Polypropylene |
| PP5 | TOTAL3576X | Total Petrochemicals | Polypropylene |
| PMP1 | TPX DX820 | Mitsui Chemicals | Polymethylpentene copolymer |
| PE1 | HDPE | Sigma-Aldrich | High density polyethylene |

Examples 1-52 and Comparative Examples CE1-CE21: Electret Webs

A series of Non-Woven Webs were Prepared, Charged and Tested. The prepared webs are summarized in Table 3. In Table 3 the phenolate salts are described by the phenol and the metal cation, for example the sodium salt of Phenol-1 is described in the table as: Phenol 1-Na. Comparative webs were also prepared with the resin alone or the resin with a phenol additive or other additive and no phenolate salt. Comparative Webs are described by the descriptor CE.

Non-Woven Sample Preparation

Step A: Preparation of Microfiber Non-Woven Webs

Process A:

For each Example, one of the Charging Additives described above was selected and dry blended with one of the four grades of polypropylene at the concentration shown in Table 1, and the blend was extruded as described in Van A. Wente, "Superfine Thermoplastic Fibers," Industrial Engineering Chemistry, vol. 48, pp. 1342-1346. The extrusion temperature ranged from about 250° C.-300° C. and the extruder was a BRABENDER conical twin-screw extruder (commercially available from Brabender Instruments, Inc.) operating at a rate of about 2.5 to 3 kg/hr (5-7 lb/hr). The die was 25.4 cm (10 in) wide with 10 holes per centimeter (25 holes per inch). Melt-blown webs were formed having basis weights of about 50-60 g/m$^2$, effective fiber diameters of about 6.5-9.5 micrometers and a thicknesses of about 0.75-2 millimeters.

Process B:

A mono-component monolayer nonwoven web was produced from different PP resins with melt additives using the process described in U.S. Patent Publication No. 2008/0038976. The extrusion head had orifices of 0.35 mm diameter with a 4:1 L/D (length to diameter) ratio which were configured in a pattern having a linear density of approximately 900 orifices per meter. The orifices were spaced forming adjoining isosceles triangles with a base aligned 90 degrees to the direction of travel of the collector belt of 14 mm and a height of 9.5 mm, the holes being at the vertices. There were 13 rows of holes. The flow rate of molten PP polymer was approximately 1.99 grams per orifice per minute, with an extrusion temperature of around 210 to 260° C.

Two opposed quenching air streams were supplied from quench boxes 41 cm in height with an approximate face velocity of 0.8 m/sec and a temperature slightly chilled from ambient. A movable-wall attenuator similar to that shown in U.S. Pat. Nos. 6,607,624 and 6,916,752 was employed, using an air knife gap of 0.51 mm, air fed to the air knife at a pressure of 117 kPa, an attenuator top gap width of 7.1 mm, an attenuator bottom gap width of 7.1 mm, and an attenuation chamber length of 15 cm. The distance from the extrusion head to the attenuator was approximately 61 cm, and the distance from the bottom of the attenuator to the collection belt was approximately 66 cm. The melt-spun filament stream was deposited on the collection belt at a width of about 53 cm with a vacuum established under the collection belt of approximately 650 Pa. The collection belt was a 9 SS TC model from Albany International Corp. (Rochester, N.H.) and moved at a certain velocity ("forming speed").

The mass (web) of collected melt-spun nonwoven filaments was then passed underneath a controlled-heating bonding device to autogeneously bond some of the filaments together. Air was supplied through the bonding device which had an outlet slot 7.6 cm by 71 cm. The air outlet was about 2.5 cm from the collected web as the web passed underneath the bonding device. The temperature and velocity of the air passing through the slot were controlled by the heating device. The temperature was measured at the entry point for the heated air into the housing of the bonding device. Ambient temperature air was forcibly drawn through the web after the web passed underneath the bonding device, to cool the web to approximately ambient temperature.

The resulting nonwoven web was bonded with sufficient integrity to be self-supporting and handleable using standard processes and equipment, such as wound onto a storage roll or subjected to various operations such as assembly into a filtration device. Webs were collected at a certain basis weight produced by varying the speed of the collection belt. Several different webs were produced, as described in Table 3.

TABLE 3

| Example | Resin | Phenolate Salt (wt %) | Coadditive (wt %) | EFD (micrometers) | Basis Wt (g/m$^2$) | Solidity (%) | Preparation Process |
|---|---|---|---|---|---|---|---|
| CE1 | PP1 | | | 8.1 | 54 | 5.7 | A |
| CE2 | PP1 | Phenol 8 (0.20) | | 8.1 | 57 | 6.4 | A |
| CE3 | PP1 | Phenol 10 (0.20) | | 8.1 | 58 | 6.1 | A |
| CE4 | PP1 | Phenol 11 (0.20) | | 8.1 | 57 | 7.1 | A |
| CE5 | PP1 | | | 7.7 | 54 | 5.0 | A |
| CE6 | PP1 | | | 7.9 | 55 | 6.4 | A |
| CE7 | PP1 | | CA-2 (0.80) | 7.2 | 55 | 6.9 | A |
| CE8 | PP1 | Phenol 7 (0.25) | | 7.3 | 56 | 6.6 | A |
| CE9 | PP1 | Phenol 9 (0.25) | | 7.9 | 55 | 6.4 | A |
| CE10 | PP2 | | | 7.9 | 57 | 5.3 | A |
| CE11 | PP2 | Phenol 7 (0.25) | | 7.8 | 57 | 6.5 | A |
| CE12 | PP2 | | | 7.2 | 55 | 6.6 | A |
| CE13 | PP3 | | | 8.9 | 58 | 6.6 | A |
| CE14 | PP3 | | CA-1 (1.0) | 7.9 | 62 | 6.2 | A |
| CE15 | PP4 | | | 8.1 | 57 | 5.6 | A |
| CE16 | PMP1 | | | 9.3 | 57 | 8.9 | A |
| CE17 | PP4 | | | 17.9 | 66 | 12.4 | B |
| CE18 | PP1 | Phenol 12 (0.15) | | 7.9 | 55 | 6.4 | A |
| CE19 | PP1 | Phenol 16 (0.15) | | 7.8 | 56 | 6.7 | A |
| CE20 | PP1 | Phenol 17 (0.15) | | 8.0 | 57 | 6.7 | A |
| CE21 | PP5 | | | 17 | 65 | 11.3 | B |
| 1 | PP1 | Phenol 1 - Na (0.20) | | 8.4 | 58 | 5.8 | A |
| 2 | PP1 | Phenol 2 - Na (0.20) | | 7.9 | 56 | 6.4 | A |
| 3 | PP1 | Phenol 3 - Na (0.20) | | 8.5 | 58 | 5.5 | A |
| 4 | PP1 | Phenol 4 - Na (0.20) | | 7.8 | 58 | 5.4 | A |
| 5 | PP1 | Phenol 5 - Na (0.20) | | 8.3 | 58 | 6.0 | A |
| 6 | PP1 | Phenol 6 - Na (0.10) | | 8.1 | 56 | 6.5 | A |
| 7 | PP1 | Phenol 8 - Na (0.20) | | 8.9 | 58 | 6.6 | A |
| 8 | PP1 | Phenol 9 - Mg (0.20) | | 8.1 | 59 | 5.9 | A |
| 9 | PP1 | Phenol 9 - Co (0.20) | | 8.4 | 60 | 6.1 | A |
| 10 | PP1 | Phenol 9 - Mg (0.60) | | 8.8 | 59 | 6.7 | A |
| 11 | PP1 | Phenol 10 - Na (0.20) | | 8.1 | 58 | 5.8 | A |
| 12 | PP1 | Phenol 10 - Ca (0.20) | | 8.2 | 57 | 5.8 | A |
| 13 | PP1 | Phenol 11 - Ca (0.20) | | 7.5 | 59 | 6.3 | A |
| 14 | PP1 | Phenol 11 - Ca (0.50) | | 8.6 | 58 | 6.6 | A |
| 15 | PP1 | Phenol 1 - Ti (0.25) | | 8.0 | 56 | 5.6 | A |
| 16 | PP1 | Phenol 9 - Ca (0.20) | | 8.5 | 56 | 6.2 | A |
| 17 | PP1 | Phenol 9 - Ca (0.20) | | 8.1 | 54 | 6.0 | A |
| 18 | PP1 | Phenol 9 - Ca (0.40) | | 7.9 | 56 | 5.9 | A |
| 19 | PP1 | Phenol 7 - Na (0.25) | | 7.8 | 55 | 6.0 | A |
| 20 | PP1 | Phenol 7 - Na (0.25) | CA-2 (0.80) | 7.9 | 56 | 6.6 | A |
| 21 | PP1 | Phenol 9 - Na (0.25) | CA-2 (0.80) | 8.3 | 56 | 5.9 | A |
| 22 | PP1 | Phenol 9 - Ca (0.25) | CA-2 (0.80) | 8.1 | 57 | 6.2 | A |
| 23 | PP1 | Phenol 9 - Ca (0.25) | | 7.9 | 55 | 6.4 | A |
| 24 | PP1 | Phenol 9 - Na (0.25) | | 7.9 | 55 | 5.3 | A |
| 25 | PP1 | Phenol 9 - K (0.25) | | 8.4 | 55 | 6.5 | A |
| 26 | PP2 | Phenol 1 - K (0.25) | | 8.6 | 60 | 5.8 | A |
| 27 | PP2 | Phenol 1 - K (0.75) | | 8.1 | 57 | 6.1 | A |
| 28 | PP2 | Phenol 7 - K (0.25) | | 8.6 | 58 | 6.2 | A |
| 29 | PP2 | Phenol 7 - K (0.75) | | 8.6 | 56 | 5.8 | A |
| 30 | PP2 | Phenol 9 - Ca (0.75) | | 9.1 | 56 | 5.9 | A |

TABLE 3-continued

| Example | Resin | Phenolate Salt (wt %) | Coadditive (wt %) | EFD (micrometers) | Basis Wt (g/m²) | Solidity (%) | Preparation Process |
|---|---|---|---|---|---|---|---|
| 31 | PP2 | Phenol 9 - Na (0.05) | | 7.6 | 54 | 6.5 | A |
| 32 | PP2 | Phenol 9 - Na (0.10) | | 8.5 | 55 | 5.6 | A |
| 33 | PP2 | Phenol 9 - Li (0.10) | | 8.4 | 55 | 6.5 | A |
| 34 | PP2 | Phenol 9 - Ca (2.0) | | 7.5 | 54 | 6.0 | A |
| 35 | PP3 | Phenol 9 - Ca (0.20) | | 7.7 | 63 | 6.3 | A |
| 36 | PP3 | Phenol 9 - Ca (0.20) | | 7.8 | 63 | 6.4 | A |
| 37 | PP3 | Phenol 9 - Ca (0.20) | CA-1 (1.0) | 8.0 | 63 | 6.0 | A |
| 38 | PP4 | Phenol 9 - Ca (0.01) | | 8.1 | 59 | 5.8 | A |
| 39 | PP4 | Phenol 9 - Ca (0.05) | | 8.4 | 57 | 6.0 | A |
| 40 | PMP1 | Phenol 9 - Ca (0.1) | | 10.4 | 55 | 7.3 | A |
| 41 | PP4 | Phenol 9 - Ca (0.10) | | 16.5 | 67 | 11.9 | B |
| 42 | PP1 | Phenol 9 - Ca (0.15) | | 7.7 | 55 | 7.2 | A |
| 43 | PP1 | Phenol 12 - Na(0.15) | | 7.8 | 56 | 5.5 | A |
| 44 | PP1 | Phenol 12 - Na(0.15) | | 7.9 | 58 | 6.6 | A |
| 45 | PP1 | Phenol 13 - Na (0.15) | | 8.2 | 56 | 6.7 | A |
| 46 | PP1 | Phenol 14 - Na (0.15) | | 8.2 | 55 | 7.0 | A |
| 47 | PP1 | Phenol 15 - Na (0.15) | | 8.3 | 54 | 6.9 | A |
| 48 | PP1 | Phenol 16 - Na(0.15) | | 8.3 | 56 | 6.9 | A |
| 49 | PP1 | Phenol 17 - Na(0.15) | | 8.2 | 56 | 7.1 | A |
| 50 | PP1 | Phenol 17 - Ca(0.15) | | 8.0 | 55 | 6.6 | A |
| 51 | PP1 | Phenol 18 | | 7.9 | 56 | 6.4 | A |
| 52 | PP4 | Phenol 9 - Ca (0.10) | CA-1 (0.5%) | 17 | 65 | 11.3 | B |

Step B—Electret Preparation:

Each of the melt-blown webs prepared in Step A or each of spun-bond webs prepared in Step B as above was charged by one of three electret charging methods: corona charging, corona pre-treatment and hydrocharging, or hydrocharging. Table 4 summarizes the specific charging method applied to each of the samples.

Charging Method 1—Corona Charging:

The selected melt-blown webs or films prepared above were charged by DC corona discharge. The corona charging was accomplished by passing the web on a grounded surface under a corona brush source with a corona current of about 0.01 milliamp per centimeter of discharge source length at a rate of about 3 centimeters per second. The corona source was about 3.5 centimeters above the grounded surface on which the web was carried. The corona source was driven by a positive DC voltage.

Charging Method 2—Corona Pre-Treatment and Hydrocharging:

The selected melt-blown webs prepared in Step A above were pretreated by DC corona discharge as described in Charging Method 1 and then charged by hydrocharging as described in Charging Method 3.

Charging Method 3—Hydrocharging:

A fine spray of high purity water having a conductivity of less than 5 microS/cm was continuously generated from a nozzle operating at a pressure of 896 kiloPascals (130 psig) and a flow rate of approximately 1.4 liters/minute. The selected melt-blown webs prepared in Step A were conveyed by a porous belt through the water spray at a speed of approximately 10 centimeters/second while a vacuum simultaneously drew the water through the web from below. Each melt-blown web was run through the hydrocharger twice (sequentially once on each side) and then allowed to dry completely overnight prior to filter testing.

Likewise, for each Comparative Example, a melt-blown web was prepared from the same grade of polypropylene as the corresponding Examples web, but no charge additive was added. Table 3 summarizes the specific web characteristics for each of the examples.

Filtration Performance Test Method, Non-Woven Melt-Blown Microfiber Webs

The samples were tested for % DOP aerosol penetration (% Pen) and pressure drop ($\Delta P$), and the quality factor (QF) was calculated from these two values. The filtration performance (% Pen and QF) of the nonwoven microfiber webs were evaluated using an Automated Filter Tester AFT Model 8127 (available from TSI, Inc., St. Paul, Minn.) using dioctylphthalate (DOP) as the challenge aerosol and a MKS pressure transducer that measured pressure drop ($\Delta P$ (mm of $H_2O$)) across the filter. The DOP aerosol was nominally a monodisperse 0.33 micrometer mass median (MMD) diameter having an upstream concentration of 50-200 mg/m³ and a target of 100 mg/m³. The aerosol was forced through a sample of filter media at a calibrated flow rate of either 42.5 liters/minute (face velocity of 6.9 cm/s) for webs made by Process A or 85 liters/minute (face velocity of 13.8 cm/s) for webs made by Process B. The aerosol ionizer turned off for these tests. The total testing time was 23 seconds (rise time of 15 seconds, sample time of 4 seconds, and purge time of 4 seconds). The concentration of DOP aerosols was measured by light scattering both upstream and downstream of the filter media using calibrated photometers. The DOP % Pen is defined as: % Pen=100×(DOP concentration downstream/DOP concentration upstream). For each material, 6 separate measurements were made at different locations on the melt-blown web and the results were averaged.

The % Pen and $\Delta P$ were used to calculate a QF by the following formula:

$$QF = -\ln(\% \text{ Pen}/100)/\Delta P,$$

where ln stands for the natural logarithm. A higher QF value indicates better filtration performance and decreased QF values effectively correlate with decreased filtration performance. For webs formed by Process B, webs were tested as a two layer laminate.

TABLE 4

| Example | Charging Method | Penetration (%) | Pressure Drop (mm H$_2$O) | QF (1/mm H$_2$O) |
|---|---|---|---|---|
| CE1 | 1 | 22.47 | 2.17 | 0.69 |
| CE2 | 1 | 21.10 | 2.13 | 0.73 |
| CE3 | 1 | 22.50 | 2.08 | 0.72 |
| CE4 | 1 | 18.33 | 2.58 | 0.66 |
| CE1 | 2 | 12.30 | 2.25 | 0.93 |
| CE2 | 2 | 12.23 | 2.23 | 0.94 |
| CE3 | 2 | 7.45 | 2.22 | 1.18 |
| CE4 | 2 | 11.35 | 2.65 | 0.82 |
| 1 | 1 | 18.70 | 2.47 | 0.68 |
| 2 | 1 | 17.35 | 2.22 | 0.79 |
| 3 | 1 | 21.60 | 1.70 | 0.90 |
| 4 | 1 | 18.15 | 2.15 | 0.79 |
| 5 | 1 | 19.60 | 1.87 | 0.87 |
| 6 | 1 | 17.04 | 2.10 | 0.85 |
| 7 | 1 | 20.28 | 1.87 | 0.85 |
| 8 | 1 | 18.98 | 1.83 | 0.88 |
| 9 | 1 | 21.62 | 1.75 | 0.88 |
| 10 | 1 | 18.93 | 1.93 | 0.86 |
| 11 | 1 | 19.73 | 1.77 | 0.92 |
| 12 | 1 | 19.83 | 1.63 | 0.99 |
| 13 | 1 | 17.93 | 2.10 | 0.82 |
| 14 | 1 | 18.50 | 1.88 | 0.90 |
| 1 | 2 | 6.34 | 2.03 | 1.36 |
| 2 | 2 | 3.34 | 2.25 | 1.51 |
| 3 | 2 | 4.57 | 1.65 | 1.87 |
| 4 | 2 | 5.89 | 2.27 | 1.25 |
| 5 | 2 | 3.58 | 1.93 | 1.73 |
| 6 | 2 | 6.90 | 1.90 | 1.41 |
| 7 | 2 | 4.03 | 2.05 | 1.57 |
| 8 | 2 | 5.49 | 1.78 | 1.63 |
| 9 | 2 | 4.97 | 2.02 | 1.49 |
| 10 | 2 | 4.53 | 2.10 | 1.47 |
| 11 | 2 | 3.60 | 1.77 | 1.88 |
| 12 | 2 | 4.24 | 1.83 | 1.73 |
| 13 | 2 | 4.34 | 2.02 | 1.55 |
| 14 | 2 | 5.70 | 1.87 | 1.53 |
| CE5 | 1 | 17.18 | 2.72 | 0.65 |
| 15 | 1 | 15.70 | 1.78 | 1.05 |
| 16 | 1 | 9.00 | 2.40 | 1.01 |
| 17 | 1 | 9.39 | 2.38 | 1.00 |
| 18 | 1 | 8.42 | 2.28 | 1.09 |
| CE6 | 1 | 33.45 | 2.28 | 0.77 |
| CE7 | 1 | 14.50 | 2.70 | 0.72 |
| CE8 | 1 | 23.20 | 2.50 | 0.58 |
| CE9 | 1 | 10.21 | 3.23 | 0.71 |
| CE6 | 2 | 8.15 | 2.33 | 1.08 |
| CE7 | 2 | 3.64 | 2.57 | 1.29 |
| CE8 | 2 | 7.88 | 2.43 | 1.05 |
| CE9 | 2 | 8.35 | 2.57 | 0.97 |
| CE7 | 3 | 0.47 | 2.65 | 2.03 |
| 19 | 1 | 10.80 | 2.30 | 0.96 |
| 20 | 1 | 11.40 | 2.30 | 0.97 |
| 21 | 1 | 9.50 | 2.20 | 1.06 |
| 22 | 1 | 10.90 | 2.10 | 1.07 |
| 23 | 1 | 8.37 | 2.45 | 1.02 |
| 24 | 1 | 8.87 | 2.10 | 1.16 |
| 25 | 1 | 10.61 | 2.55 | 0.89 |
| 19 | 2 | 2.90 | 2.20 | 1.61 |
| 20 | 2 | 3.32 | 2.23 | 1.53 |
| 21 | 2 | 2.36 | 2.05 | 1.83 |
| 22 | 2 | 3.71 | 1.93 | 1.71 |
| 23 | 2 | 3.93 | 2.58 | 1.36 |
| 24 | 2 | 1.45 | 2.05 | 2.08 |
| 25 | 2 | 2.89 | 2.72 | 1.31 |
| 20 | 3 | 0.28 | 2.58 | 2.29 |
| 21 | 3 | 0.31 | 2.23 | 2.61 |
| 22 | 3 | 0.58 | 2.13 | 2.43 |
| CE10 | 1 | 25.30 | 2.40 | 0.58 |
| CE11 | 1 | 18.80 | 2.35 | 0.71 |
| 26 | 1 | 18.10 | 1.98 | 0.86 |
| 27 | 1 | 15.90 | 1.97 | 0.94 |
| 28 | 1 | 16.75 | 1.90 | 0.94 |
| 29 | 1 | 15.73 | 1.60 | 1.18 |
| 30 | 1 | 14.57 | 1.63 | 1.18 |
| CE12 | 1 | 19.98 | 2.70 | 0.60 |
| CE12 | 2 | 4.97 | 2.46 | 1.23 |
| 31 | 1 | 19.86 | 2.52 | 0.65 |
| 32 | 1 | 17.54 | 1.90 | 0.92 |
| 33 | 1 | 16.04 | 1.94 | 0.94 |
| 34 | 1 | 18.56 | 2.22 | 0.76 |
| 31 | 2 | 3.16 | 2.84 | 1.22 |
| 32 | 2 | 6.19 | 1.72 | 1.62 |
| 33 | 2 | 5.62 | 1.88 | 1.53 |
| 34 | 2 | 3.99 | 2.12 | 1.52 |
| CE13 | 1 | 26.20 | 2.04 | 0.66 |
| CE14 | 1 | 13.66 | 3.06 | 0.65 |
| CE13 | 3 | 46.58 | 1.83 | 0.42 |
| CE14 | 3 | 0.29 | 2.85 | 2.07 |
| 35 | 1 | 13.94 | 2.54 | 0.78 |
| 36 | 1 | 15.44 | 2.42 | 0.78 |
| 37 | 1 | 12.42 | 2.48 | 0.84 |
| 35 | 3 | 16.13 | 2.25 | 0.82 |
| 36 | 3 | 30.50 | 2.15 | 0.55 |
| 37 | 3 | 0.51 | 2.22 | 2.40 |
| CE15 | 1 | 22.88 | 2.26 | 0.66 |
| CE15 | 2 | 3.61 | 2.10 | 1.58 |
| 38 | 1 | 18.74 | 2.34 | 0.72 |
| 39 | 1 | 13.06 | 2.04 | 1.00 |
| 38 | 2 | 2.02 | 2.24 | 1.75 |
| 39 | 2 | 3.24 | 1.96 | 1.75 |
| CE16 | 1 | 21.18 | 2.04 | 0.76 |
| 40 | 1 | 17.02 | 1.44 | 1.23 |
| CE17[a] | 1 | 60.65 | 1.47 | 0.34 |
| CE17[a] | 2 | 68.70 | 1.62 | 0.24 |
| 41a | 1 | 55.88 | 1.52 | 0.38 |
| 41a | 2 | 46.73 | 1.57 | 0.49 |
| 42 | 1 | 15.23 | 2.6 | 0.73 |
| 42 | 2 | 8.47 | 2.5 | 0.98 |
| CE18 | 1 | 10.67 | 2.8 | 0.80 |
| CE18 | 2 | 19.07 | 2.5 | 0.68 |
| 43 | 1 | 17.48 | 2.0 | 0.90 |
| 43 | 2 | 9.46 | 1.9 | 1.25 |
| 44 | 1 | 13.13 | 2.4 | 0.85 |
| 44 | 2 | 11.30 | 2.3 | 0.96 |
| 45 | 1 | 15.20 | 2.1 | 0.90 |
| 45 | 2 | 19.00 | 2.0 | 0.85 |
| 46 | 1 | 13.07 | 2.1 | 0.96 |
| 46 | 2 | 20.02 | 2.1 | 0.77 |
| 47 | 1 | 17.25 | 2.47 | 0.72 |
| 47 | 2 | 16.67 | 2.22 | 0.81 |
| CE19 | 1 | 10.71 | 2.7 | 0.84 |
| CE19 | 2 | 18.70 | 2.6 | 0.66 |
| 48 | 1 | 20.87 | 2.0 | 0.82 |
| 48 | 2 | 13.68 | 2.1 | 0.97 |
| CE20 | 1 | 12.53 | 2.7 | 0.77 |
| CE20 | 2 | 9.68 | 2.6 | 0.92 |
| 49 | 1 | 11.45 | 2.7 | 0.80 |
| 49 | 2 | 8.63 | 2.4 | 1.05 |
| 50 | 1 | 12.98 | 2.1 | 0.97 |
| 50 | 2 | 8.21 | 2.0 | 1.28 |
| 51 | 1 | 12.62 | 2.4 | 0.87 |
| 51 | 2 | 10.73 | 2.2 | 1.00 |
| CE21[a] | 1 | 50.5 | 1.5 | 0.45 |
| CE21[a] | 2 | 55.1 | 1.7 | 0.35 |
| 52[a] | 1 | 51.5 | 1.4 | 0.48 |
| 52[a] | 2 | 39.2 | 1.4 | 0.71 |

[a]Measured at 85 l pm, as specified under the Test Methods

Examples 53-62 and Comparative Examples CE22-CE25: Charged Film Preparation

Step A—Preparation of Charged Films:

For the film examples, 0.2 grams of one of the additives described above was selected and compounded for 1 minute with 130 grams polypropylene in a 5 zone, 30 mm twin screw extruder. After compounding, the material was cast out of a 4 inch drop die and coated between two silicone liners. The nominal coating weight was 1 mil. The extrusion temperatures ranged from 185° C.-250° C. The films were then charged using Charging Method 1 (see above) and tested using Thermally Stimulated Discharge Current (TSC) (see below).

Step B—Analysis of Charged Films

Thermally Stimulated Discharge Current Measurement, Flat Films

The effective charge density of the flat films was determined by integrating the absolute discharge current measured using a Solomat TSC/RMA Model 91000 Spectrometer with a pivot electrode, distributed by TherMold Partners, L. P., Stamford, Conn. Samples were cut and secured between a lower fixed electrode and an upper spring-loaded electrode in the Solomat TSC/RMA. The area of the upper electrode is 0.38 cm$^2$ (about 7 mm in diameter). In the TSC/RMA instrument, a thermometer is disposed adjacent to, but not touching the sample. The samples should be optically dense, such that there are no holes visible through the sample. Since the electrode is about 7 mm in diameter, the samples were cut larger than the 7 mm in diameter. To ensure good electrical contact with the electrodes, the samples were compressed in thickness by a factor of about 10. Air and moisture were evacuated from the sample cell through a series of flushing stages and the cell was backfilled with helium to approximately 1100 mbar. The sample cell was cooled by liquid nitrogen as desired by the specific test protocol.

Current measurements were made while heating the sample at a controlled temperature ramp rate of 5° C./min up to 175° C. During such a thermally stimulated discharge, charges stored in the electret become mobile and are neutralized either at the electrodes or in the bulk sample by recombination with charges of opposite sign. This will generate an external current that shows a number of peaks when recorded as a function of temperature. The shape and location of these peaks depends on charge trapping energy levels and the physical location of the trapping sites. By integrating the current versus temperature plot, one can calculate an effective charge density in picoCoulombs/mm$^2$ (pC/mm$^2$). The integration was done using the trapezoid rule, where the curve is divided into a series of trapezoids with an area that equals the average height multiplied by the width. The areas are summed together and divided by the heating rate to obtain the amount of charge in Coulombs.

TABLE 6

| Example | Polymer Resin | Additive | Integration Range | Peak Temperature (° C.) | Integrated Area (pC/mm$^2$) |
|---|---|---|---|---|---|
| CE22 | PP4 | — | 90-151 | — | 0.27 |
| CE23 | PE1 | — | 45-145 | 59 | 0.18 |
| CE24 | PP4 | Phenol 9 | 90-151 | 139 | 0.15 |
| CE25 | PP4 | Phenol 10 | 88-137 | 105 | 0.70 |
| 53 | PP4 | Phenol 9-Ca | 90-152 | 133 | 0.91 |
| 54 | PP4 | Phenol 9-K | 90-143 | 120 | 0.43 |
| 55 | PP4 | Phenol 9-Ti | 90-143 | 139 | 0.47 |
| 56 | PP4 | Phenol 10-Ca | 88-137 | 121 | 0.96 |
| 57 | PE1 | Phenol 9-Ca | 45-145 | 112 | 1.19 |
| 58 | PP4 | Phenol 16 | 99-148 | 130 | 0.47 |
| 59 | PP4 | Phenol 16-Ca | 100-145 | 126 | 0.57 |
| 60 | PP4 | Phenol 16-Na | 100-145 | 136 | 0.70 |
| 61 | PP4 | Phenol 11 | 100-143 | 134 | 0.50 |
| 62 | PP4 | Phenol 11-Ca | 101-142 | 129 | 0.96 |

What is claimed is:

1. An electret web comprising:
   a thermoplastic resin consisting essentially of polyolefin, polyvinyl chloride, polystyrene, or polycarbonate; and
   a charge-enhancing additive comprising at least one substituted benzotriazole phenolate salt, wherein the electret web exhibits a quasi-permanent electric charge.

2. The electret web of claim 1, wherein the web comprises a non-woven fibrous web.

3. The electret web of claim 1, wherein the web comprises a film.

4. The electret web of claim 1, wherein the charge-enhancing additive comprises a substituted benzotriazole phenolate anion and a metal cation with the structure:

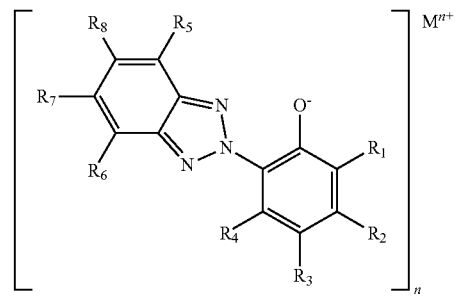

wherein $R^1$ and $R^3$ independently comprises a hydrogen atom or a substituent group such that at least one of $R^1$ and $R^3$ is a substituent group comprising a halogen atom, an alkyl or substituted alkyl group, an alkenyl group, or a group comprising an —O—$R^9$, a —N—$R^9R^{10}$, a —B(OR$^{18}$)(OR$^{19}$), or a —SiR$^{20}{}_3$, wherein $R^9$ comprises a hydrogen atom, an alkyl group, an alkenyl group, an aryl group, or a heteroatom-containing group comprising one or more oxygen, nitrogen, sulfur, or phosphorous atoms, and $R^{10}$ comprises a hydrogen atom, an alkyl group, an alkenyl group, an aryl group, or a heteroatom-containing group comprising one or more oxygen, nitrogen, sulfur, or phosphorous atoms, or $R^9$ and $R^{10}$ together with the atoms connecting form a heterocyclic ring structure, each $R^{18}$ and $R^{19}$ is independently a hydrogen atom, an alkyl group, an aryl group, or $R^{18}$ and $R^{19}$ together with the atoms connecting form a heterocyclic ring structure, and each $R^{20}$ group is an alkyl group;

each $R^2$, $R^4$, $R^5$, $R^6$, $R^7$, and $R^8$, independently comprises a hydrogen atom, an alkyl group, an alkenyl group, an aryl group, or a halogen atom;

n is the valency of metal atom M and also is the stoichiometric number of for the anionic portion of the salt, and is an integer of 1-4; and M comprises a transition metal or main group metal atom with a valency of n.

5. The electret web of claim 4, wherein n=1 and M comprises lithium, sodium, or potassium.

6. The electret web of claim 4, wherein $R^1$ comprises a hydrogen atom and $R^3$ is an alkyl group with 1-20 carbon atoms.

7. The electret web of claim 4, wherein $R^1$ comprises:
   an alkyl, substituted alkyl, or alkenyl group with 1-20 carbon atoms; and
   $R^3$ is an alkyl group with 1-20 carbon atoms.

8. The electret web of claim 4, wherein $R^1$ comprises an —O—$R^9$ group wherein $R^9$ comprises:
   an alkyl group with 1-20 carbon atoms; or
   an aryl group; and
   $R^3$ is an alkyl group with 1-20 carbon atoms.

9. The electret web of claim 8, wherein $R^9$ comprises:
an alkyl group with 1-6 carbon atoms; or
an aryl group comprising a 3-methyl phenyl group, or a 4-methyl phenyl group.

10. The electret web of claim 4, wherein $R^1$ comprises an —N—$R^9R^{10}$ group wherein $R^9$ comprises:
an alkyl group with 1-20 carbon atoms; or
an aryl group;
$R^{10}$ comprises a hydrogen atom or alkyl group with 1-6 carbon atoms; and
$R^3$ is an alkyl group with 1-20 carbon atoms.

11. The electret web of claim 10, wherein $R^9$ comprises:
an alkyl group with 1-6 carbon atoms; or
an aryl group comprising a 4-alkyl substituted phenyl group, wherein the alkyl substituted group has 1-6 carbon atoms;
$R^{10}$ comprises a hydrogen atom.

12. The electret web of claim 1, wherein the charge-enhancing additive comprises a substituted benzotriazole phenolate anion and a metal cation with the structure:

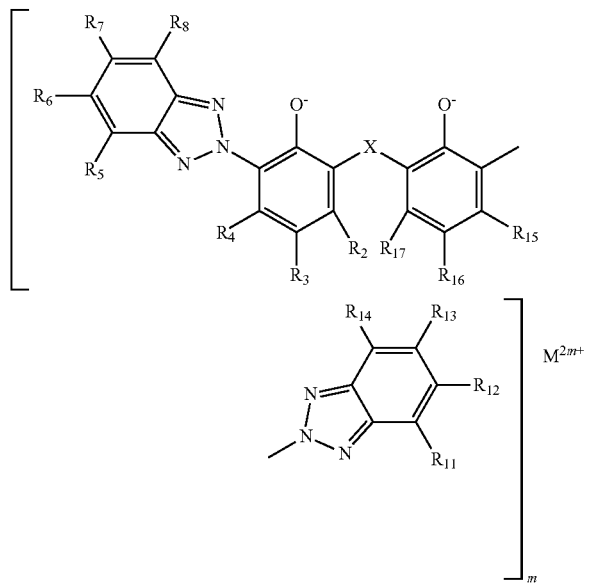

wherein X is a linking group comprising a —$CH_2$—, —O—, —$NR^{10}$—, —S(O)—, —$S(O)_2$—, or —S—, where S(O) is a sulfinyl group S=O, $S(O)_2$ is a sulfonyl group O=S=O, and where $R^{10}$ comprises a hydrogen atom, an alkyl group, or an aryl group;
each $R^2$, $R^3$, $R^4$, $R^5$, $R^6$, $R^7$, $R^8$, $R^{11}$, $R^{12}$, $R^{13}$, $R^{14}$, $R^{15}$, $R^{16}$, and $R^{17}$, independently comprises a hydrogen atom, an alkyl group, an alkenyl group, an aryl group, or a halogen atom;
m=0.5, 1 or 2;
M is a metal ion with a valency of 2 m such that M is lithium sodium or potassium when m=0.5;
M is calcium, magnesium, or cobalt, when m=1; and M is vanadium or titanium when m=2.

13. The electret web of claim 12, wherein X comprises a —$CH_2$— linking group;
$R^3$ and $R^{16}$, each comprises an alkyl group with 1-20 carbon atoms; and
when m=0.5, M is lithium, sodium, or potassium, and when m=1, M is calcium.

14. The electret web of claim 12, wherein X comprises an —$NR^{10}$— linking group where
$R^{10}$ comprises a hydrogen atom, an alkyl group comprising 1-3 carbon atoms;
$R^3$ and $R^{16}$, each comprises an alkyl group with 1-20 carbon atoms; and
when m=0.5, M is lithium, sodium, or potassium, and when m=1, M is calcium.

15. The electret web of claim 12, wherein X comprises an —O— linking group;
$R^3$ and $R^{16}$ each comprises an alkyl group with 1-20 carbon atoms; and
when m=0.5, M is lithium, sodium, or potassium, and when m=1, M is calcium.

16. The electret web of claim 1, wherein the charge-enhancing additive comprises 0.01-5.0% by weight of the web.

17. The electret web of claim 1, wherein the web contains an electrostatic charge, wherein the charge is imparted through corona treatment, hydrocharging, or a combination thereof.

18. The electret web of claim 1, wherein the web contains an electrostatic charge, wherein the charge is imparted through corona treatment.

19. The electret web of claim 1, wherein the web further comprises at least one additional additive selected from pigments, light stabilizers, primary and secondary antioxidants, metal deactivators, hindered amines, hindered phenols, fatty acid metal salts, triester phosphites, phosphoric acid salts, fluorine-containing compounds, nucleating agents, and combinations thereof.

20. The electret web of claim 1, wherein the electret web comprises an electret filter medium.

21. The electret web of claim 20, wherein the filter medium has a % Penetration Ratio of at least 300% at a face velocity of 6.9 centimeters per second when tested according to an X-ray Discharge Test.

22. The electret web of claim 20, wherein the filter medium has an Initial Quality Factor of at least 0.3 (mm of $H_2O)^{-1}$ at a face velocity of 6.9 centimeters per second, and after exposure to X-rays for 60 minutes, a Quality Factor of less than 50% of the Initial Quality Factor, when tested according to an X-ray Discharge Test.

23. The electret web of claim 20, wherein the filter medium retains at least 85% filtration performance as measured by Quality Factor after aging for 72 hours at 71° C.

* * * * *